(12) United States Patent
Yamaguchi

(10) Patent No.: US 11,204,302 B2
(45) Date of Patent: Dec. 21, 2021

(54) DYNAMOMETER SYSTEM HAVING ELECTRIC INERTIA CONTROL DEVICE TO SIMULATE BEHAVIOR OF INERTIAL BODY

(71) Applicant: Meidensha Corporation, Tokyo (JP)

(72) Inventor: Takashi Yamaguchi, Tokyo (JP)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 17/291,219

(22) PCT Filed: Aug. 20, 2019

(86) PCT No.: PCT/JP2019/032482
§ 371 (c)(1),
(2) Date: May 4, 2021

(87) PCT Pub. No.: WO2020/095506
PCT Pub. Date: May 14, 2020

(65) Prior Publication Data
US 2021/0310900 A1 Oct. 7, 2021

(30) Foreign Application Priority Data
Nov. 7, 2018 (JP) .............................. JP2018-209612

(51) Int. Cl.
G01M 13/025 (2019.01)
(52) U.S. Cl.
CPC ................................ G01M 13/025 (2013.01)
(58) Field of Classification Search
CPC ............. G01M 13/025; G01M 13/026; G01M 13/027; G01M 17/00; G01M 17/0074
See application file for complete search history.

(56) References Cited

U.S. PATENT DOCUMENTS 5,078,008 A * 1/1992 Yagi ..................... G01M 15/044
73/116.05
7,142,974 B2 * 11/2006 Sugita ................. G01M 15/044
701/114
(Continued)

FOREIGN PATENT DOCUMENTS

JP 05215643 A 8/1993
JP 2511316 Y 9/1996
(Continued)

OTHER PUBLICATIONS

Office Action of JP Application No. 2018-209612, dated Nov. 12, 2019, 2 pages.

*Primary Examiner* — Eric S. McCall
(74) *Attorney, Agent, or Firm* — Muncy, Geissler, Olds & Lowe, P.C.

(57) ABSTRACT

According to the present invention, an input-side dynamometer control device is provided with an inertia compensator, a resonance suppression controller 53, a set value acquisition unit 58 for acquiring set values $J_{set}$, $J_{tgt}$. The resonance suppression controller 53 is provided with: a plurality of resonance suppression control modules 541-546 that generate input-side torque current command signals Ti on the basis of an inertia compensation torque signal $T_{ref}$ and an input-side shaft torque detection signal $T_{12}$ so as to suppress resonance; and a selector 55 that selects one of the control modules 541-546 on the basis of the set values $J_{set}$, $J_{tgt}$. The inertia compensation torque signal $T_{ref}$ and the input-side shaft torque detection signal $T_{12}$ are inputted to one of the resonance suppression control modules selected by the selector 55, and the input-side torque current command signal generated by the selected resonance suppression control module is inputted to an inverter.

13 Claims, 11 Drawing Sheets

(56) References Cited

U.S. PATENT DOCUMENTS

| | | | | |
|---|---|---|---|---|
| 7,610,799 B2* | 11/2009 | Sugita | .................. | G01M 15/044 |
| | | | | 73/114.15 |
| 9,164,005 B2* | 10/2015 | Takahashi | ................ | H02P 23/12 |
| 9,335,228 B2* | 5/2016 | Takahashi | .................. | G01L 3/22 |
| 9,778,140 B2* | 10/2017 | Suzuki | .................. | G01M 15/02 |
| 10,451,522 B2* | 10/2019 | Sugita | ........................ | G01P 3/36 |
| 2019/0219481 A1* | 7/2019 | Akiyama | .................... | H02P 6/08 |
| 2019/0278237 A1* | 9/2019 | Akiyama | .................. | G01L 5/26 |
| 2020/0103296 A1* | 4/2020 | Yamaguchi | ................ | G01L 3/16 |
| 2020/0271539 A1* | 8/2020 | Akiyama | ............ | G01M 13/025 |
| 2020/0348206 A1* | 11/2020 | Akiyama | ............ | G01M 13/022 |
| 2021/0011454 A1* | 1/2021 | Kanke | .................. | G01M 99/00 |

FOREIGN PATENT DOCUMENTS

| | | | |
|---|---|---|---|
| JP | 2004361255 A | | 12/2004 |
| JP | 3757839 B | | 3/2006 |
| JP | 2014142317 A | | 8/2014 |
| WO | WO-2018/190303 A1 | | 10/2018 |

* cited by examiner

DYNAMOMETER SYSTEM HAVING ELECTRIC INERTIA CONTROL DEVICE TO SIMULATE BEHAVIOR OF INERTIAL BODY

TECHNICAL FIELD

The present invention relates to an electric inertia control device. More specifically, the present invention relates to an electric inertia control device which simulates, in a dynamometer system where a dynamometer is connected to the input shaft or the output shaft of a test piece, the behavior of an inertial body having predetermined set inertia by the dynamometer.

BACKGROUND ART

Drive train collectively refers to a plurality of devices for transmitting energy generated in an engine to drive wheels, and includes the engine, clutch, transmission, drive shaft, propeller shaft, differential gears, drive wheels, and the like. In a performance evaluation test of a drive train, the transmission actually continues to be driven by the engine, and thus the durability, the quality, and the like thereof are evaluated. In recent years, it has been proposed that a dynamometer system in which a dynamometer is coupled to the output shaft or the input shaft of a drive train serving as a test piece is used so as to perform a performance evaluation test of the drive train.

In the dynamometer system as described above, a load which simulates the engine with an input-side dynamometer coupled to the input shaft of the drive train can be inputted to the drive train, and a load which simulates a traveling vehicle body with an output-side dynamometer coupled to the output shaft of the drive train can be absorbed. In the dynamometer system as described above, electric inertia control which electrically compensates for the inertia of the dynamometer to set an inertia determined with consideration given to an actual device is performed such that the behaviors of the input-side dynamometer and the output-side dynamometer are brought close to behavior corresponding to the actual device.

FIG. 11 is a diagram showing an example of a conventional electric inertia control device 100. In the electric inertia control device 100, a dynamometer system formed by coupling a dynamometer having a moment of inertia $J_1$ and a test piece having a moment of inertia $J_2$ with a coupling shaft having shaft rigidity $K_{12}$ is a control object 101. The electric inertia control device 100 generates an angular speed signal by multiplying a signal obtained by integrating a torque signal obtained by subtracting a shaft torque detection signal $T_{12}$ from a higher-level torque command signal T* by the inverse of a predetermined set moment of inertia $J_{set}$, and further performs speed control corresponding to a difference between the angular speed signal and an angular speed detection signal $\omega_1$ of the dynamometer so as to perform inertia compensation. In this way, in the dynamometer, the behavior of an inertial body having the set moment of inertia can be simulated. However, in the electric inertia control device 100 of FIG. 11, a plurality of integrators are present, and thus a significant control delay occurs, with the result that the enhancement of a control bandwidth is limited depending on the degree of equipment resonance.

FIG. 12 is a diagram showing the configuration of an electric inertia control device 150 based on the disclosure of Japanese Unexamined Patent Application, Publication No. 2004-361255. In the electric inertia control device 150, a torque signal obtained by subtracting a shaft torque detection signal 112 from a higher-level torque command signal T* is multiplied by a ratio of the moment of inertia $J_1$ of a dynamometer relative to a set function $J_{set}$, and the resulting torque signal and the shaft torque detection signal $T_{12}$ are summed so as to generate a torque current command signal $T_1$. In the electric inertia control device 150 of FIG. 12, the shaft torque detection signal $T_{12}$ is directly fed back such that the moment of inertia $J_1$ of the dynamometer is cancelled out and the moment of inertia of the dynamometer is established as an inertial body of the set moment of inertia $J_{set}$.

Patent Document 1: Japanese Unexamined Patent Application, Publication No. 2004-361255

DISCLOSURE OF THE INVENTION

Problems to be Solved by the Invention

In the electric inertia control device 150 of FIG. 12, control can be performed in which a delay is reduced as compared with the electric inertia control device 100 of FIG. 11. However, in the electric inertia control device 150 of FIG. 12, the shaft torque detection signal is directly fed back, and thus the control may become unstable depending on the degree of facility resonance. As described above, in the conventional electric inertia control devices 100 and 150, it is possible to respond to a control requirement in a low bandwidth, but it may be impossible to sufficiently respond to a control requirement in a high bandwidth.

For example, when a test is performed by using an input-side dynamometer so as to simulate an actual engine, since a torque pulsation produced in the actual engine is simulated, as a higher-level command torque signal, a signal containing a harmonic component may be inputted to an electric inertia control device. Furthermore, for example, when a test is performed by using an output-side dynamometer so as to simulate an actual vehicle body, since a slip phenomenon occurring in the actual vehicle body is reproduced, with an electric inertia control device, a quick behavior of an inertial body having a very small moment of inertia may be simulated. Hence, an electric inertia control device is desired which can also sufficiently respond to a control requirement in a high bandwidth.

An object of the present invention is to provide an electric inertia control device which simulates the behavior of an inertial body having a predetermined set inertia by a dynamometer and which can perform control up to a high bandwidth.

Means for Solving the Problems (1) A dynamometer system (for example, the dynamometer system S described later) includes: a test piece (for example, the test piece W described later) including a shaft (for example, the input shaft Wi or the output shaft Wo described later); a dynamometer (for example, the input-side dynamometer 11 described later) connected to the shaft via a coupling shaft (for example, the input-side coupling shaft S1 described later); an inverter (for example, the input-side inverter 21 described later) supplying electric power to the dynamometer according to a torque current command signal; and a shaft torque sensor (for example, the input-side shaft torque sensor 41 described later) generating a shaft torque detection signal corresponding to a shaft torque occurring in the coupling shaft. An electric inertia control device according to the present invention (for example, the input-side dynamometer control device 5 described later)

that simulates behavior of an inertial body having predetermined set inertia by a dynamometer in the dynamometer system. The electric inertia control device includes: an inertia compensator (for example, the inertia compensator 52) that generates an inertia compensation torque signal simulating behavior of the inertial body based on a higher-level torque command signal and the shaft torque detection signal; a resonance suppression control device (for example, the resonance suppression control device 53 described later) that generates the torque current command signal so as to suppress a resonance of a mechanical system including the test piece and the dynamometer based on the inertia compensation torque signal and the shaft torque detection signal; and a set value acquiring unit (for example, the set value acquiring unit 58 described later) that acquires at least one of a set value of the set inertia and a set value of test piece inertia. The resonance suppression control device includes a plurality of control modules (for example, the resonance suppression control modules 541 to 546 described later) generating the torque current command signal so as to suppress the resonance based on the inertia compensation torque signal and the shaft torque detection signal, and each having different input-output characteristics, and a selector (for example, the selector 55 described later) that selects one of the plurality of control modules based on a set value acquired by the set value acquiring unit, and the resonance suppression control device is configured to input the inertia compensation torque signal and the shaft torque detection signal to a control module selected by the selector, and input a torque current command signal generated in the control module selected to the inverter.

(2) In such a case, it is preferable that the set value acquiring unit acquires both a set value of the set inertia and a set value of the test piece inertia, and the selector includes an association unit (for example, the control module selection unit 551 described later) that associates a range to which a combination of a value of the set inertia and a value of the test piece inertia belongs with one among the plurality of control modules, and is configured to select a control module with which the combination of the set values acquired by the set value acquiring unit is associated by the association unit.

(3) In such a case, it is preferable that, in a case in which a value of the set inertia and a value of the test piece inertia belong to a range associated by the association unit, each of the control modules is designed to stably exhibit a control performance equal to or more than a predetermined required control performance.

(4) In such a case, it is preferable that the control module is a controller (for example, the controller K described later) designed by a computer so as to satisfy a predetermined design condition in a feedback control system (for example, the feedback control system 8 described later) including: a generalized plant (for example, the generalized plant P described later) including a nominal plant (for example, the nominal plant N1 described later) simulating input-output characteristics of a control object (for example, the control object 9 described later) and an inertia compensation unit (for example, the inertia compensation unit N2 described later) simulating input-output characteristics of the inertia compensator; a test piece inertia perturbation unit (for example, the first perturbation unit ΔP1 described later) that imparts a variation to a test piece inertia parameter (for example, the first nominal moment of inertia Jen described later) included in the nominal plant; a set inertia perturbation unit (for example, the second perturbation unit ΔP2 described later) that imparts a variation to a set inertia parameter (for example, the second nominal moment of inertia $J_{set\_n}$ described later) included in the inertia compensation unit; and the controller that gives an input to the generalized plant based on an output from the generalized plant.

(5) In such a case, it is preferable that the each of the control modules is the controller designed by changing a range for imparting a variation to the test piece inertia parameter by the test piece inertia perturbation unit and a range for imparting a variation to the set inertia parameter by the set inertia perturbation unit in the feedback control system.

(6) In such a case, it is preferable that the test piece is a vehicle drive train that changes speed of dynamic force inputted to an input shaft (for example, an input shaft Wi described later) and transmits the dynamic force to an output shaft (for example, an output shaft Wo described later), and the dynamometer (an input-side dynamometer 11 described later) is connected to the input shaft via the coupling shaft.

(7) In such a case, it is preferable that the test piece is a vehicle drive train that changes speed of dynamic force inputted to an input shaft (for example, an input shaft Wi described later) and transmits the dynamic force to an output shaft (for example, an output shaft Wo described later), and the dynamometer (an absorption-side dynamometer 12 described later) is connected to the output shaft via the coupling shaft.

Effects of the Invention (1) In the electric inertia control device of the present invention, an inertia compensator generates an inertia compensation torque signal which simulates the behavior of the inertial body based on the higher-level torque command signal and the shaft torque detection signal. In the inertia compensator, as described above, the shaft torque detection signal is directly fed back so as to generate the inertia compensation torque signal, and thus the dynamometer can highly accurately simulate the behavior of the inertial body having the set inertia. In the electric inertia control device of the present invention, a resonance suppression control device uses the inertia compensation torque signal obtained in the inertia compensator and the shaft torque detection signal to generate a torque current command signal so as to suppress the resonance of a mechanical system that includes a test piece and the dynamometer. In this way, in the electric inertia control device of the present invention, it is possible to extend a control response up to a high bandwidth, while preventing instability caused by a resonance phenomenon in the mechanical system.

However, in the dynamometer system, the test piece and the set inertia can be appropriately changed by the operator according to the test contents. Therefore, versatility is required for the resonance suppression control device to be able to exhibit the resonance suppression control function even when the test piece connected to the dynamometer is replaced with a test piece having different inertia or when the set value of the set inertia is changed. However, with a general control device design method, it becomes difficult to design a controller as the versatility is made higher. Furthermore, even if such a highly versatile controller can be designed, only conservative results can be obtained with such a controller, and the control response may be deteriorated.

In contrast, the resonance suppression control device of the present invention includes a plurality of control modules having a resonance suppression control function and each having different input/output characteristics, and a selector that selects one of the plurality of control modules based on at least one set value of the set inertia acquired by the set value acquiring unit and the test piece inertia, and the resonance suppression control device inputs the inertia compensation torque signal and the shaft torque detection signal to the control module selected by the selector, and inputs the torque current command signal generated by the control module selected to the inverter. In other words, in the resonance suppression control device according to the present invention, the plurality of control modules having a resonance suppression control function is prepared in advance, and a control module selected according to the set value of the set inertia and the test piece inertia among the plurality of control modules is incorporated into the control circuit. Therefore, in the electric inertia control device according to the present invention, the plurality of control modules each having low versatility but high control response are designed beforehand, and a control module selected according to the set value of the set inertia and the test piece inertia among the plurality of control modules can be incorporated into the control circuit, a result of which it is possible to perform high electric inertia control of the control response even when the test piece or the set inertia is changed.

(2) In the electric inertia control device according to the present invention, the set value acquiring unit acquires both a set value of the set inertia and a set value of the test piece inertia, and the selector selects a control module with which the combination of the set values is associated by the association unit. Therefore, according to the present invention, it is possible to incorporate an appropriate control module according to the set values of the set inertia and the test piece inertia, thereby performing electric inertia control with a high control response.

(3) In the electric inertia control device of the present invention, in a case in which values of the set inertia and the test piece inertia belong to a range associated by the association unit, each of the control modules is designed to stably exhibit a control performance equal to or more than a predetermined required control performance. Therefore, according to the present invention, it is possible to perform electric inertia control with a high control response even when the test piece or the set inertia is changed.

(4) In the electric inertia control device according to the present invention, for the control module, a controller is used which is designed by a computer so as to satisfy a predetermined design condition in a feedback control system including: a nominal plant and a generalized plant including an inertia compensation unit; a test piece inertia perturbation unit; a set inertia perturbation unit; and the controller for the generalized plant. According to the present invention, by utilizing the controller designed by a design method based on the generalized plant as described above as a control module for realizing resonance suppression control, it is possible to perform electric inertia control with a high control response.

(5) In the electric inertia control device according to the present invention, for each of the control modules, the controller is used which is designed by changing a range for imparting a variation to the test piece inertia parameter by the test piece inertia perturbation unit and a range for imparting a variation to the set inertia parameter by the set inertia perturbation unit in the feedback control system. Therefore, according to the present invention, it is possible to incorporate an appropriate control module according to the set values of the set inertia and the test piece inertia, thereby performing electric inertia control with a high control response.

(6) In the electric inertia control device according to the present invention, the test piece is set as a vehicle drive train having an input shaft and an output shaft, and the electric inertia control device performs electric inertia control with the dynamometer connected to the input shaft of the test piece as a control object. Therefore, according to the present invention, in the completed vehicle equipped with the test piece, it is possible to perform electric inertia control with a high control response even when the set inertia and the test piece corresponding to the moment of inertia of the power generating source such as an engine or a motor connected to the input shaft of the test piece is changed, a result of which it is highly convenient.

(7) In the electric inertia control device according to the present invention, the test piece is set as a vehicle drive train having an input shaft and an output shaft, and the electric inertia control device performs electric inertia control with the dynamometer connected to the output shaft of the test piece as a control object. Therefore, according to the present invention, in the completed vehicle equipped with the test piece, it is possible to perform electric inertia control with a high control response even when the set inertia and the test piece corresponding to the vehicle weight acting on the output shaft of the test piece is changed, a result of which it is highly convenient.

PREFERRED MODE FOR CARRYING OUT THE INVENTION

Figure 1:
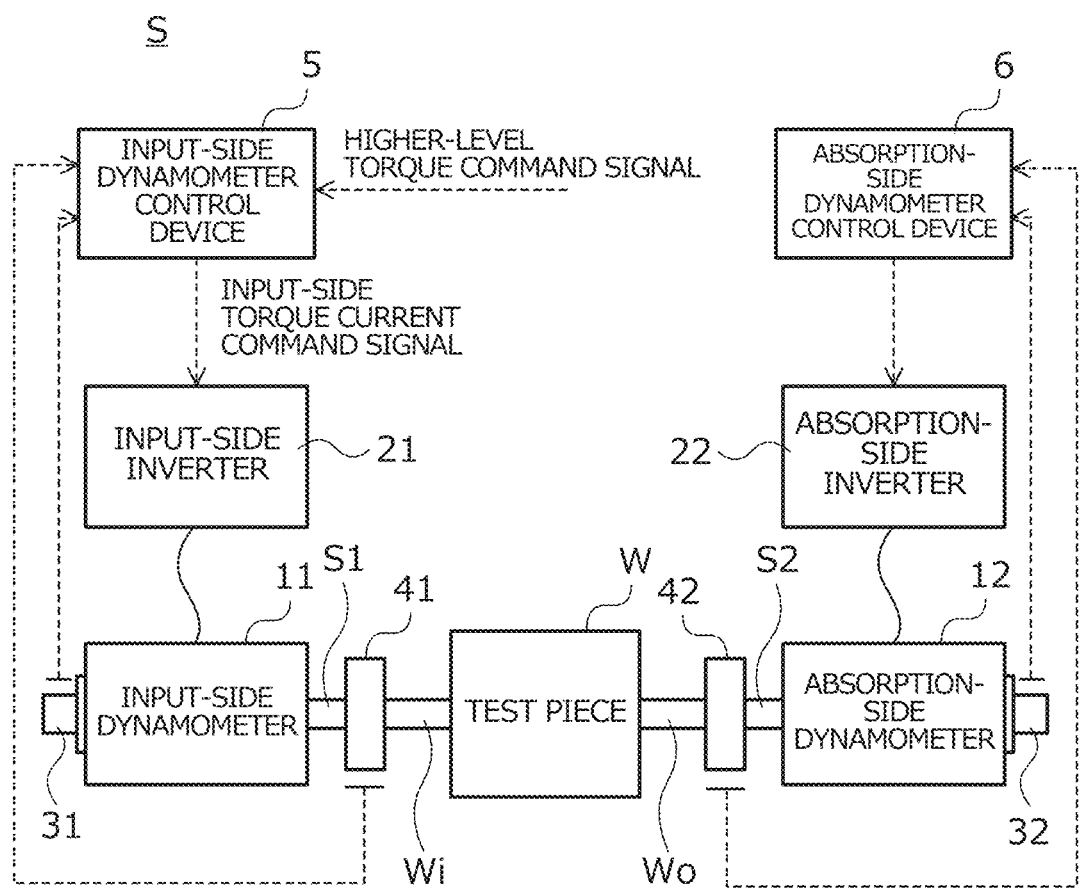
FIG. 1 is a diagram showing the configuration of a dynamometer system according to an embodiment of the present invention.

An embodiment of the present invention will be described in detail below with reference to the drawings. FIG. 1 is a diagram showing the configuration of a dynamometer system S according to the present embodiment. In the dynamometer system S, a drive train of a vehicle including an input shaft Wi and an output shaft Wo connected to the input shaft Wi so as to be able to transmit power is a test piece W, and the performance of the test piece W is evaluated, and the dynamometer system S is referred to as a so-called drive train bench system. In the completed vehicle equipped with the test piece W, a power generating source such as an engine or a drive motor is connected to the input shaft Wi, and drive wheels are connected to the output shaft Wo. Although in the following, a case in which a drive train mounted in a so-called rear wheel drive (FR) vehicle is a test piece W will be described, the present invention is not limited to this case. More specifically, for example, a drive train which includes one input shaft and two output shafts connected to the input shaft so as to be able to transmit power and which is mounted in a so-called front wheel drive (FF) vehicle may be the test piece.

The dynamometer system S includes: the test piece W; an input-side dynamometer 11 which is connected to the input shaft Wi through an input-side coupling shaft S1; an absorption-side dynamometer 12 which is connected to the output shaft Wo through an absorption-side coupling shaft S2; an input-side inverter 21 which supplies electric power to the input-side dynamometer 11 according to an input-side torque current command signal; an absorption-side inverter 22 which supplies electric power to the absorption-side dynamometer 12 according to an absorption-side torque current command signal; an input-side angular speed sensor 31 and an absorption-side angular speed sensor 32 which individually detect the angular speeds of the shafts of the dynamometers 11 and 12; an input-side shaft torque sensor 41 and an absorption-side shaft torque sensor 42 which individually detect the shaft torques of the coupling shafts S1 and S2; an input-side dynamometer control device 5 which generates the input-side torque current command signal and which inputs it to the input-side inverter 21; and an absorption-side dynamometer control device 6 which generates the absorption-side torque current command signal and which inputs it to the absorption-side inverter 22.

The input-side angular speed sensor 31 detects the rotation angle per unit time of the shaft of the input-side dynamometer 11, generates an input-side angular speed detection signal corresponding to the angular speed, and transmits it to the input-side dynamometer control device 5. The absorption-side angular speed sensor 32 detects the rotation angle of the shaft of the absorption-side dynamometer 12 per unit time, generates an absorption-side angular speed detection signal corresponding to the angular speed, and transmits it to the absorption-side dynamometer control device 6.

The input-side shaft torque sensor 41 detects the shaft torque generated in the coupling shaft S1, and transmits an input-side shaft torque detection signal corresponding to the shaft torque to the input-side dynamometer control device 5. The absorption-side shaft torque sensor 42 detects the shaft torque generated in the coupling shaft S2, and transmits an absorption-side shaft torque detection signal corresponding to the shaft torque to the absorption-side dynamometer control device 6.

The absorption-side dynamometer control device 6 uses the absorption-side angular speed detection signal and the absorption-side shaft torque detection signal so as to generate the absorption-side torque current command signal according to a known algorithm, and inputs it to the absorption-side inverter 22.

The input-side dynamometer control device 5 is an electric inertia control device. By using a predetermined higher-level torque command signal, an input-side angular speed detection signal, and an input-side shaft torque detection signal, the input-side dynamometer 11 generates an input-side torque current command signal that, for example, simulates the behavior of the inertial body having a predetermined set inertia, and inputs this to the input-side inverter 21. In the completed vehicle equipped with the test piece W as described above, since a power generating source such as an engine or a drive motor is connected to the input shaft Wi of the test piece W, the above set inertia is set by the operator on the assumption of the moment of inertia of the power generating source. The specific configuration of the control circuit of the input-side dynamometer control device 5 for executing the electric inertia control as described above will be described with reference to FIG. 2, etc. later.

When a higher-level torque command signal transmitted via communication from the higher-level controller (not shown), and the input-side angular speed detection signal and the input-side shaft torque detection signal transmitted from the input-side angular speed sensor 31 and the input-side shaft torque sensor 41 mounted on the input-side dynamometer 11 are inputted, the input-side dynamometer control device 5 generates an input-side torque current command signal, and inputs it to the input-side inverter 21 via communication. When the input-side torque command signal is inputted from the input-side dynamometer control device 5, the input-side inverter 21 which is electrically connected to the input-side dynamometer 11 generates a torque corresponding to the input-side torque current command signal to the input-side dynamometer 11. It should be noted that examples of disturbance elements assumed at this time include noise generated when measuring the angular speed and shaft torque in the input-side angular speed sensor 31 and the input-side shaft torque sensor 41, the time delay in each communication path, and a nonlinear deviation between the generated torque and the input-side torque current command signal by the control response, etc. of the input-side inverter 21. It should be noted that the above-described higher-level torque command signal may be generated by a higher-level controller separate from the input-side dynamometer control device 5 as described above, or alternatively may be generated by a module constructed separately from the control circuit that executes the above-described electric inertia control in the interior of the input-side dynamometer control device 5.

Figure 2:
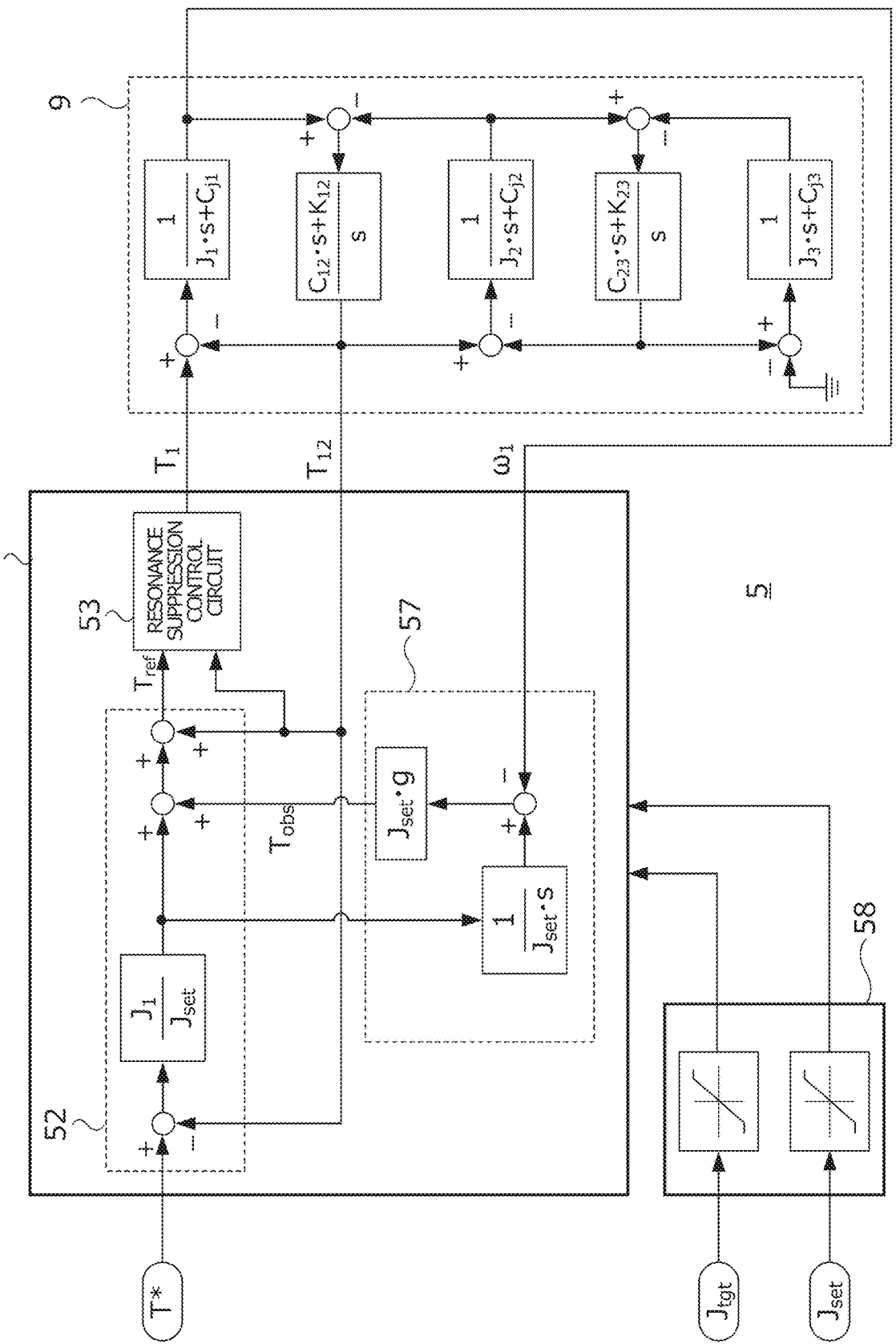
FIG. 2 is a diagram showing the configuration of a control circuit of an input-side dynamometer control device.

FIG. 2 is a diagram showing the configuration of a control circuit of the input-side dynamometer control device 5. The input-side dynamometer control device 5 includes an electric inertia control module 51 for executing electric inertia control on a control object 9, and a set value acquiring unit 58 for acquiring various set values necessary to execute the electric inertia control.

The control object 9 is constituted by a dynamometer system S which is constituted by connecting the input shaft Wi of the test piece W and the input-side dynamometer 11 through the input-side coupling shaft S1, and the output shaft Wo of the test piece W and the absorption-side dynamometer 12 through the absorption-side coupling shaft S2.

In the following explanation, the Laplace operator is denoted by "s", the moment of inertia of the input-side dynamometer is denoted by "$J_1$", the viscous friction coefficient of the input-side dynamometer is denoted by "$C_{j1}$", the moment of inertia of the test piece is denoted by "$J_2$", the viscous friction coefficient of the test piece is denoted by "$C_{j2}$", the moment of inertia of the absorption-side dynamometer is denoted by "$J_3$", and the viscous friction coefficient of the absorption-side dynamometer is denoted by "$C_{j3}$". In addition, the spring coefficient of the input-side coupling shaft is denoted as "$K_{12}$", the torsional damping coefficient of the input-side coupling shaft is denoted as "$C_{12}$", the spring coefficient of the absorption-side coupling shaft is denoted as "$K_{23}$", and the torsional damping coefficient of the absorption-side coupling shaft is denoted as "$C_{23}$". Here, the viscous friction coefficient refers to the friction coefficient proportional to the speed of the rotating body.

Furthermore, in the following description, the higher-level torque command signal generated by a higher-level controller (not shown) is denoted as "T*", the input-side torque current command signal generated by the electric inertia control module 51 is denoted as "$T_1$", the input-side shaft torque detection signal, which is a shaft torque generated by the input-side coupling shaft and thus a detection signal of the input-side shaft torque sensor, is denoted as "$T_{12}$", and the input-side angular speed detection signal, which is an angular speed of the shaft of the input-side dynamometer, and thus a detection signal of the input-side angular speed sensor, is denoted as "col".

The set value acquiring unit 58 acquires, based on an operation of an input device (not shown) by an operator, the two values of a test piece inertia set value $J_{tgt}$ which is a set value for the above-described test piece having the moment of inertia $J_2$, and an electric inertia control set value $J_{set}$ which is a set value for the set inertia according to the above-described electric inertia control, and transmits the set values $J_{tgt}$ and $J_{set}$ to the electric inertia control module 51.

The set value acquiring unit 58 includes a limiter that limits the set values $J_{tgt}$ and $J_{set}$ to a predetermined set range for each of the set values. That is, the set value acquiring unit 58 outputs the upper limit value $J_{tgtU}$ as the set value when the input value for the test piece inertia set value $J_{tgt}$ acquired via the input device is larger than the upper limit value $J_{tgtU}$ of the set range, outputs the lower limit value $J_{tgtL}$ as the set value when the input value is smaller than the lower limit value $J_{tgtL}$ of the set range, and outputs the input value as the set value as is when the input value is equal to or smaller than the upper limit value $J_{tgtU}$ and equal to or larger than the lower limit value $J_{tgtL}$. Furthermore, the set value acquiring unit 58 outputs the upper limit value $J_{setU}$ as the set value when the input value for the electric inertia control set value $J_{set}$ acquired via the input device is larger than the upper limit value $J_{setU}$ of the set range, outputs the lower limit value $J_{setL}$ as the set value when the input value is smaller than the lower limit value $J_{setL}$ of the set range, and outputs the input value as the set value as is when the input value is equal to or smaller than the upper limit value $J_{setU}$ and equal to or larger than the lower limit value $J_{setL}$.

In the following explanation, a case of setting the value of the test piece inertia set value $J_{tgt}$ based on the operator's operation of the inputting device is described. However, the present invention is not to be limited thereto. In a case in which the dynamometer system S is provided with an inertial moment estimator for estimating the value of the moment of inertia $J_2$ of the test piece, the value estimated by this estimator may be adopted as the test piece inertia set value $J_{tgt}$.

The electric inertia control module 51 includes an inertia compensator 52, a resonance suppression control device 53, and a disturbance observer 57 to perform electric inertia control by using these.

The inertia compensator 52 generates an inertial compensation torque signal $T_{ref}$ that simulates an inertial body having an electric inertia control set value $J_{set}$ acquired by the set value acquiring unit 58 based on the higher-level torque command signal T*, an input-side shaft torque detection signal $T_{12}$, and a disturbance compensation torque signal $T_{obs}$ to be described later that is generated by the disturbance observer 57.

The inertia compensator 52 generates the inertial compensation torque signal $T_{ref}$ based on the following expression (1), and inputs the signal to the resonance suppression control device 53. More specifically, the inertia compensator 52 generates a pre-conversion torque signal by subtracting the input-side shaft torque detection signal $T_{12}$ from the higher-level torque command signal T*, and multiplies the pre-conversion torque signal by the ratio $(J_1/J_{set})$ of the moment of inertia $J_1$ of the input-side dynamometer relative to the electric inertia control set value $J_{set}$, thereby generating a post-conversion torque signal $((J_1/J_{set})\times(T^*-T_{12}))$. In addition, the inertia compensator 52 sums the post-conversion torque signal and the disturbance compensation torque signal $T_{obs}$ generated by the disturbance observer 57 and the input-side shaft torque detection signal $T_{12}$ so as to generate the inertia compensation torque signal $T_{ref}$.

$$T_{ref}=(J_1/J_{set})\times(T^*-T_{12})+T_{obs}+T_{12} \quad (1)$$

The disturbance observer 57 generates a disturbance compensation torque signal lobs by using the difference between the estimated signal obtained using the inertia compensator 52 and the detected signal obtained using the input-side angular speed detecting signal col, and transmits the signal to the inertia compensator 52. More specifically, the disturbance observer 57 integrates the post-conversion torque signal $((J_1/J_{set})\times(T^*-T_{12}))$ in the inertia compensator 52, further subtracts the input-side angular speed detection signal col from the angular speed estimation signal having the dimension of the angular speed obtained by multiplying the inverse of the moment of inertia $J_1$ of the input-side dynamometer 11 to the resultant signal, and further obtains the signal obtained by multiplying the resultant signal with the moment of inertia $J_1$ of the input-side dynamometer 11 and the dimensionless gain g as the disturbance compensation torque signal lobs, and then outputs the resultant signal to the inertia compensator 52.

The resonance suppression control device 53 generates the input-side torque current command signal $T_1$ so as to suppress the resonance of the control object 9 based on the inertial compensation torque signal $T_{ref}$ generated by the inertia compensator 52, and the input-side shaft torque detection signal $T_{12}$, and transmits the resultant signal to the input-side inverter 21.

Figure 3:
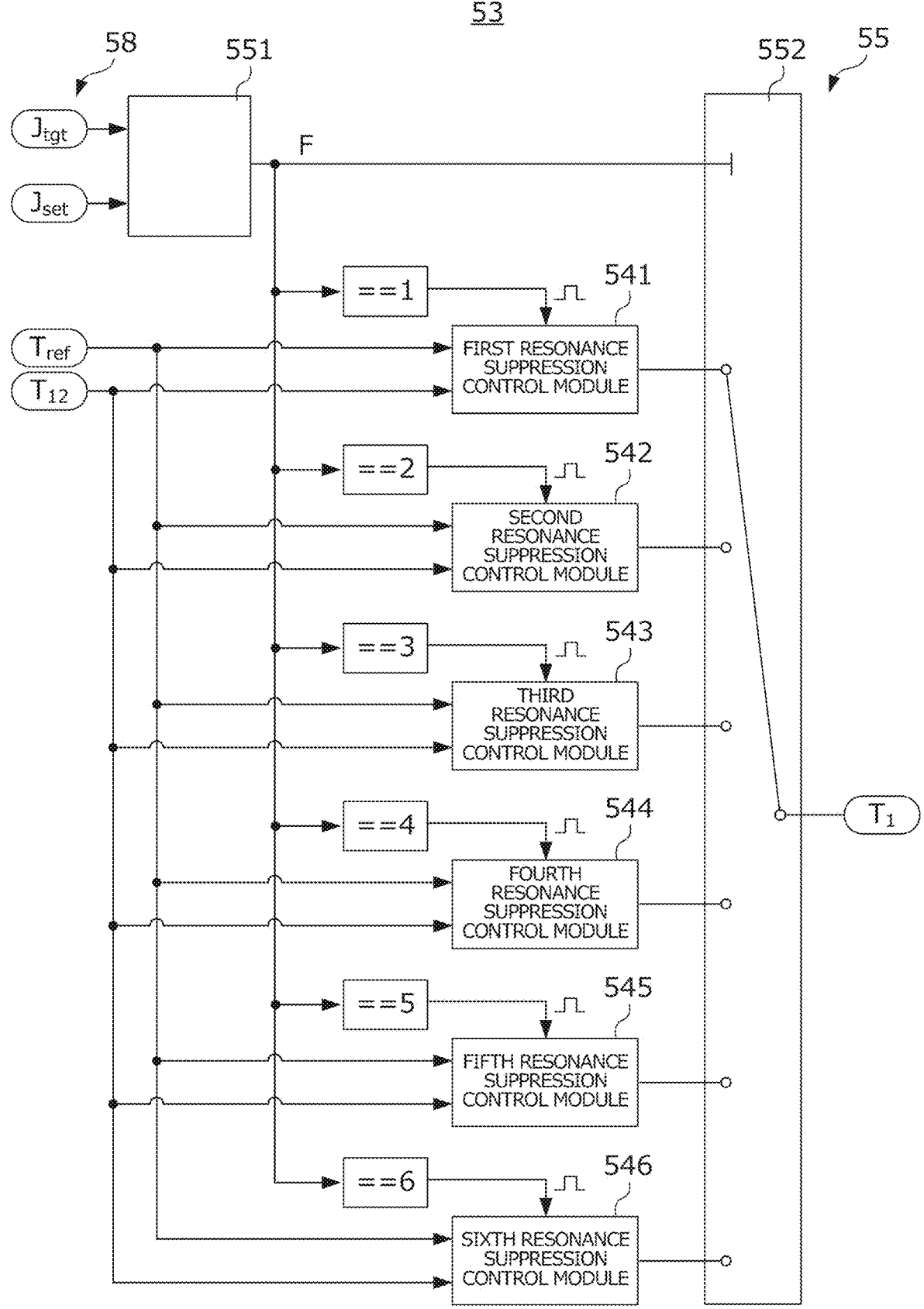
FIG. 3 is a diagram showing the configuration of a control circuit of a resonance suppression control device.

FIG. 3 is a diagram showing the configuration of a control circuit of the resonance suppression control device 53. The resonance suppression control device 53 includes a plurality of resonance suppression control modules 541, 542, 543, 544, 545, and 546, and a selector 55 for selecting one of the plurality of resonance suppression control modules 541 to 546 based on the set values $J_{tgt}$ and $J_{set}$ acquired by the set value acquiring unit 58. It should be noted that, in the following, a description will be given of a case where the number of resonance suppression control modules implemented in the resonance suppression control device 53 is 6. However, the present invention is not limited thereto. The number of resonance suppression control modules may be at least two or more.

Each of the resonance suppression control modules 541 to 546 generates the input-side torque current command signal $T_1$ so as to suppress resonance in the control object 9 based on the inertial compensation torque signal $T_{ref}$ and the input-side shaft torque detection signal $T_{12}$. Each of the resonance suppression control modules 541 to 546 has a different input-output characteristic.

Each of the resonance suppression control modules 541 to 546 includes a resonance suppression control function that generates the input-side torque current command signal $T_1$ to suppress those from which the resonance phenomenon unique to the test piece W is excluded, among the resonance phenomena that may occur in the entire mechanical system of the dynamometer system S constituted by connecting the input-side dynamometer 11, the test piece W, and the absorption-side dynamometer 12 via the coupling shafts S1 and S2 as described above.

Here, the test piece W is assumed to be a drive train which includes various spring elements. In other words, in the dynamometer system S, the rigidity of the test piece W is lower than that of the coupling shafts S1 and S2. Hence, the resonance phenomenon that occurs in the dynamometer system S is divided into a resonance phenomenon which is inherent to the test piece W and occurs on the side of relatively low frequency of about several hertz to several tens of hertz, and a resonance phenomenon which is inherent to the coupling shafts S1 and S2 and occurs on the side of relatively high frequency of several hundreds of hertz or more. Furthermore, the resonance which occurs on the side of relatively high frequency is the resonance phenomenon which is not related to the properties of the test piece W serving as a test object and is inherent to the dynamometer system S. Therefore, the resonance generated at the high frequency side is preferably suppressed by the resonance suppression control function of each of the resonance suppression control modules 541 to 546. On the other hand, the resonance which occurs on the side of low frequency is a phenomenon which is inherent to the test piece W serving as the test object. Therefore, it is not preferable for the resonance suppression control function to suppress so much as the resonance occurring on the side of such low frequency. The reason for implementing the plurality of resonance suppression control modules 541 to 546 having a resonance suppression control function in the resonance suppression control device 53 will now be described.

Figure 4:
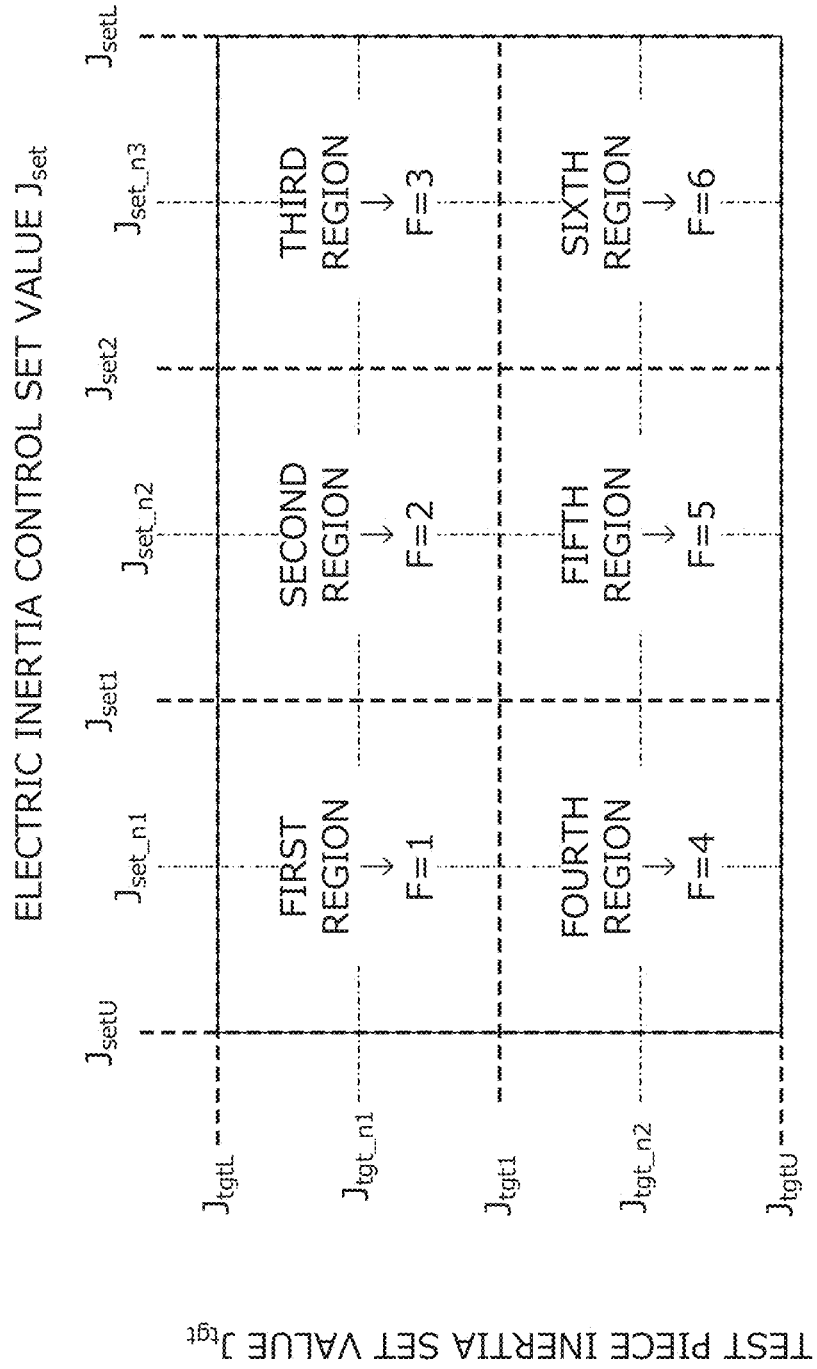
FIG. 4 is a diagram for explaining the relationship between the set range of test piece inertia set values and electric inertia control set values, and respective resonance suppression control modules.

FIG. 4 is a diagram for explaining the relationship between the set ranges of the test piece inertia set values $J_{tgt}$ and the electric inertia control set values $J_{set}$, and the respective resonance suppression control modules 541 to 546. Considering that the test piece W connected to the input-side dynamometer 11 in the dynamometer system S as described above may be replaced with one with different inertia, the operator can set the test piece inertia set value $J_{tgt}$ within the set range of the lower limit value $J_{tgtL}$ or more and the upper limit value $J_{tgtU}$ or less. Furthermore, considering the moment of inertia of the power generating source connected to the input shaft Wi in the completed vehicle equipped with the test piece W in the dynamometer system S, the operator can set the electric inertia control set value $J_{set}$ within the set range of the lower limit value $J_{setL}$ or more and the upper limit value $J_{setU}$ or less. Therefore, versatility such that can exhibit constantly stable resonance suppression control function is required in the resonance suppression control device 53, even when the test piece inertia set value $J_{tgt}$ and the electric inertia control set value $J_{set}$ are changed within the set range as shown in FIG. 4. However, with the general controller design method, it becomes more difficult to design the controller as the versatility increases. Furthermore, even if such a highly versatile controller can be designed, only conservative results may be obtained with such a controller, and the control response may be deteriorated.

Therefore, in the present embodiment, the set ranges of the test piece inertia set value $J_{tgt}$ and the electric inertia control set value $J_{set}$ are divided into a plurality of small regions, and the plurality of resonance suppression control modules 541 to 546 are designed to be specialized in the respective small regions.

As shown in FIG. 4, in the present embodiment, the set range of the test piece inertia set value $J_{tgt}$ is divided into the two of a low inertia range of the lower limit $J_{tgtL}$ or more and less than the intermediate value $J_{tgt1}$, and a high inertia range of the intermediate value $J_{tgt1}$ or more and the upper limit $J_{tgtU}$ or less. Here, the intermediate value $J_{tgt1}$ is set between the upper limit value $J_{tgtU}$ and the lower limit value $J_{tgtL}$. Furthermore, in the present embodiment, the set range of the electric inertia control set value $J_{set}$ is divided into the three ranges of: a high inertia range of the upper limit value $J_{setU}$ or less and the first intermediate value $J_{set1}$ or more, an intermediate inertia range of the first intermediate value $J_{set1}$ or less and the second intermediate value and a $J_{set2}$ or more, low inertia range of the second intermediate value $J_{set2}$ or less and the lower limit value $J_{setL}$ or more. Here, the first intermediate value $J_{set1}$ is set between the upper limit value $J_{setU}$ and the lower limit value $J_{setL}$, and the second intermediate value $J_{set2}$ is set between the first intermediate value $J_{set1}$ and the lower limit value $J_{setL}$.

Thus, the set ranges of the test piece inertia set value $J_{tgt}$ and the electric inertia control set value $J_{set}$ are divided into the six small regions of the first to sixth regions. The first region is a region in which the lower limit value $J_{tgtL} \leq J_{tgt} <$ the intermediate value $J_{tgt1}$ and the upper limit value $J_{setU} \geq J_{set} \geq$ the first intermediate value $J_{set1}$. The second region is a region in which lower limit value $J_{tgtL} \leq J_{tgt} <$ the intermediate value $J_{tgt1}$ and the first intermediate value $J_{set1} > J_{set} \geq$ the second intermediate value $J_{set2}$. The third region is a region in which the lower limit value $J_{tgtL} \leq J_{tgt} <$ the intermediate value $J_{tgt1}$ and the second intermediate value $J_{set2} > J_{set} \geq$ the lower limit value $J_{setL}$. The fourth region is a region in which the intermediate value $J_{tgt1} \leq J_{tgt} \leq$ the upper limit value $J_{tgtU}$ and the upper limit value $J_{setU} \geq J_{set} \geq$ the first intermediate value $J_{set1}$. The fifth region is a region in which the intermediate value $J_{tgt1} \leq J_{tgt} \leq$ the upper limit value $J_{tgtU}$ and the first intermediate value $J_{set1} > J_{set} \geq$ the second intermediate value $J_{set2}$. The sixth region is a region in which the intermediate value $J_{tgt1} \leq J_{tgt} \leq$ the upper limit value $J_{tgtU}$ and the second intermediate value $J_{set2} > J_{set} \geq$ the lower limit value $J_{setL}$.

Here, when the combination of the two set values $J_{tgt}$ and $J_{set}$ belongs to the first region, the first resonance suppression control module 541 is designed to stably exhibit control performance equal to or higher than a predetermined required control performance (more specifically, a control response performance above a predetermined required response frequency, hereinafter the same). When the combination of the two set values $J_{tgt}$ and $J_{set}$ belongs to the second region, the second resonance suppression control module 542 is designed to stably exhibit control performance equal to or higher than a predetermined required control performance. When the combination of the two set values $J_{tgt}$ and $J_{set}$ belongs to the third region, the third resonance suppression control module 543 is designed to stably exhibit control performance equal to or higher than a predetermined required control performance. When the combination of the two set values $J_{tgt}$ and $J_{set}$ belongs to the fourth region, the fourth resonance suppression control module 545 is designed to stably exhibit control performance equal to or higher than a predetermined required control performance. When the combination of the two set values $J_{tgt}$ and $J_{set}$ belongs to the fifth region, the fifth resonance suppression control module 545 is designed to stably exhibit control performance equal to or higher than the predetermined required control performance. When the combination of the two set values $J_{tgt}$ and $J_{set}$ belongs to the sixth region, the sixth resonance suppression control module 546 is designed to stably exhibit control performance equal to or higher than the predetermined required control performance. As described above, each of the resonance suppression control modules 541 to 546 has different input-output characteristics, since the setting ranges that stably exhibit control performance equal to or higher than the required control performance are different. It should be noted that the resonance suppression control modules 541 to 546 use controllers designed according to a procedure described below with reference to FIGS. 5 to 8.

The selector 55 includes a control module selection unit 551 for selecting one among the plurality of resonance suppression control modules 541 to 546 based on the set values $J_{tgt}$ and $J_{set}$, and a switch 552 for incorporating a module selected by the control module selection unit 551 into the control circuit.

The control module selection unit 551 includes a setting map such as that shown in FIG. 4 which associates the small region to which the combination of the test piece inertia set value $J_{tgt}$ and the electric inertia control set value $J_{set}$ belongs, and one of the plurality of resonance suppression control modules 541 to 546. The control module selection unit 551 sets the value of the selection flag F by searching the setting map based on the combination of the set values $J_{tgt}$ and $J_{set}$ acquired by the set value acquiring unit 58. The selection flag F may acquire the same integer value as the number of resonance suppression control modules 541 to 546.

When the combination of the set values $J_{tgt}$ and $J_{set}$ belongs to the first region, the control module selection unit 551 sets the value of the selection flag F to "1" in order to select the first resonance suppression control module 541 associated with the first region. When the combination of the set values $J_{tgt}$ and $J_{set}$ belongs to the second region, the control module selection unit 551 sets the value of the selection flag F to "2" in order to select the second resonance suppression control module 542 associated with the second region. When the combination of the set values $J_{tgt}$ and $J_{set}$ belongs to the third region, the control module selection unit 551 sets the value of the selection flag F to "3" in order to select the third resonance suppression control module 543 associated with the third region. When the combination of the set values $J_{tgt}$ and $J_{set}$ belongs to the fourth region, the control module selection unit 551 sets the value of the selection flag F to "4" in order to select the fourth resonance suppression control module 544 associated with the fourth region. When the combination of the set values $J_{tgt}$ and $J_{set}$ belongs to the fifth region, the control module selection unit 551 sets the value of the selection flag F to "5" in order to select the fifth resonance suppression control module 545 associated with the fifth region. When the combination of the set values $J_{tgt}$ and $J_{set}$ belongs to the sixth region, the control module selection unit 551 sets the value of the selection flag F to "6" in order to select the sixth resonance suppression control module 546 associated with the sixth region.

The switch 552 selects one among the plurality of resonance suppression control modules 541 to 546 which corresponds to the value of the selection flag F to be set by the control module selection unit 551, and incorporates the selected one into the control circuit. The switch 552 selects the first resonance suppression control module 541 when the value of the selection flag F is "1", selects the second resonance suppression control module 542 when the value of the selection flag F is "2", selects the third resonance suppression control module 543 when the value of the selection flag F is "3", selects the fourth resonance suppression control module 544 when the value of the selection flag F is "4", selects the fifth resonance suppression control module 545 when the value of the selection flag F is "5", and selects the sixth resonance suppression control module 546 when the value of the selection flag F is "6". Furthermore, the switch 552 inputs the higher-level torque command signal T* and the input-side shaft torque detection signal $T_{12}$ to the resonance suppression control module selected, and further inputs the input-side torque current command signal $T_1$ generated by the resonance suppression control module to the input-side inverter 21.

The first resonance suppression control module 541 is turned on when the value of the selection flag F is "1", and generates the input-side torque current command signal $T_1$ corresponding to the input signal (the higher-level torque command signal T* and the input-side shaft torque detection signal $T_{12}$). The second resonance suppression control module 542 is turned on when the value of the selection flag F is "2", and generates the input-side torque current command signal $T_1$ corresponding to the input signal. The third resonance suppression control module 543 is turned on when the value of the selection flag F is "3", and generates the input-side torque current command signal $T_1$ corresponding to the input signal. The fourth resonance suppression control module 544 is turned on when the value of the selection flag F is "4", and generates the input-side torque current command signal $T_1$ corresponding to the input signal. The fifth resonance suppression control module 545 is turned on when the value of the selection flag F is "5", and generates the input-side torque current command signal $T_1$ corresponding to the input signal. The sixth resonance suppression control module 546 is turned on when the value of the selection flag F is "6", and generates the input-side torque current command signal $T_1$ corresponding to the input signal.

Next, a design procedure of the resonance suppression control modules 541 to 546 that exhibit the resonance suppression control function specialized for each of the first to sixth regions as described above will be described with reference to FIGS. 5 to 8.

Figure 5:
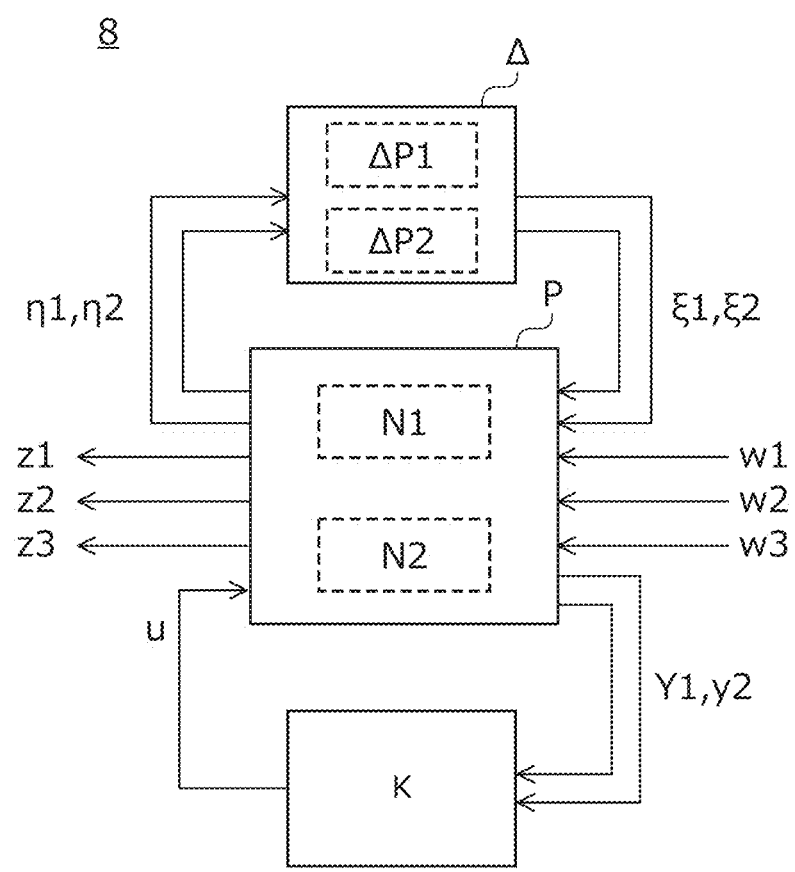
FIG. 5 is a diagram showing the configuration of a feedback control system defined in designing the resonance suppression control module.

The resonance suppression control modules 541 to 546 each define a feedback control system 8 as shown in FIG. 5 and are configured by implementing a controller K designed by a robust control system design method called $H_\infty$ control or µ synthesis into hardware including input/output ports such as a digital signal processor or a microcomputer so that a predetermined design condition is satisfied in the feedback control system 8.

The feedback control system 8 of FIG. 5 is configured by combining a generalized plant P including a nominal plant N1 simulating the input-output characteristics of the control object 9 and an inertia compensation unit N2 simulating the input-output characteristics of the inertia compensator 52 described above, a perturbation unit Δ imparting variation to the generalized plant P, and a controller K giving input-output to the generalized plant P.

The generalized plant P defines an input including a first disturbance input w1, a second disturbance input w2, and a third disturbance input w3, and an output including a first evaluation output z1, a second evaluation output z2, and a third evaluation output z3. Hereinafter, the vector quantity having the first disturbance input w1, the second disturbance input w2, and the third disturbance input w3 as components is denoted by w, and the vector quantity having the first evaluation output z1, the second evaluation output z2, and the third evaluation output z3 as components is denoted by z.

Between the generalized plant P and the controller K, a first observation output y1 corresponding to the inertia compensation torque signal (refer to $T_{ref}$ in FIG. 2) and a second observation output y2 corresponding to the input-side shaft torque detection signal (refer to $T_{12}$ in FIG. 2), and the control input u corresponding to the input-side torque current command signal (refer to $T_1$ in FIG. 2) are defined.

Furthermore, between the generalized plant P and the perturbation unit Δ, an input including a first variation input η1 and a second variation input η2, and an output including a first variation output ξ1 and a second variation output ξ2 are defined. The perturbation unit Δ includes a first perturbation unit ΔP1 that generates the first variable output μ2 based on the first variable input Ill outputted from the nominal plant N1 of the generalized plant P and gives the first variable output ξ1 to the nominal plant N1, and a second perturbation unit ΔP2 that generates the second variable output 2 based on the second variable input η2 outputted from the inertia compensation unit N2 of the generalized plant P and gives the second variable output 2 to the inertia compensation unit N2.

Figure 6:
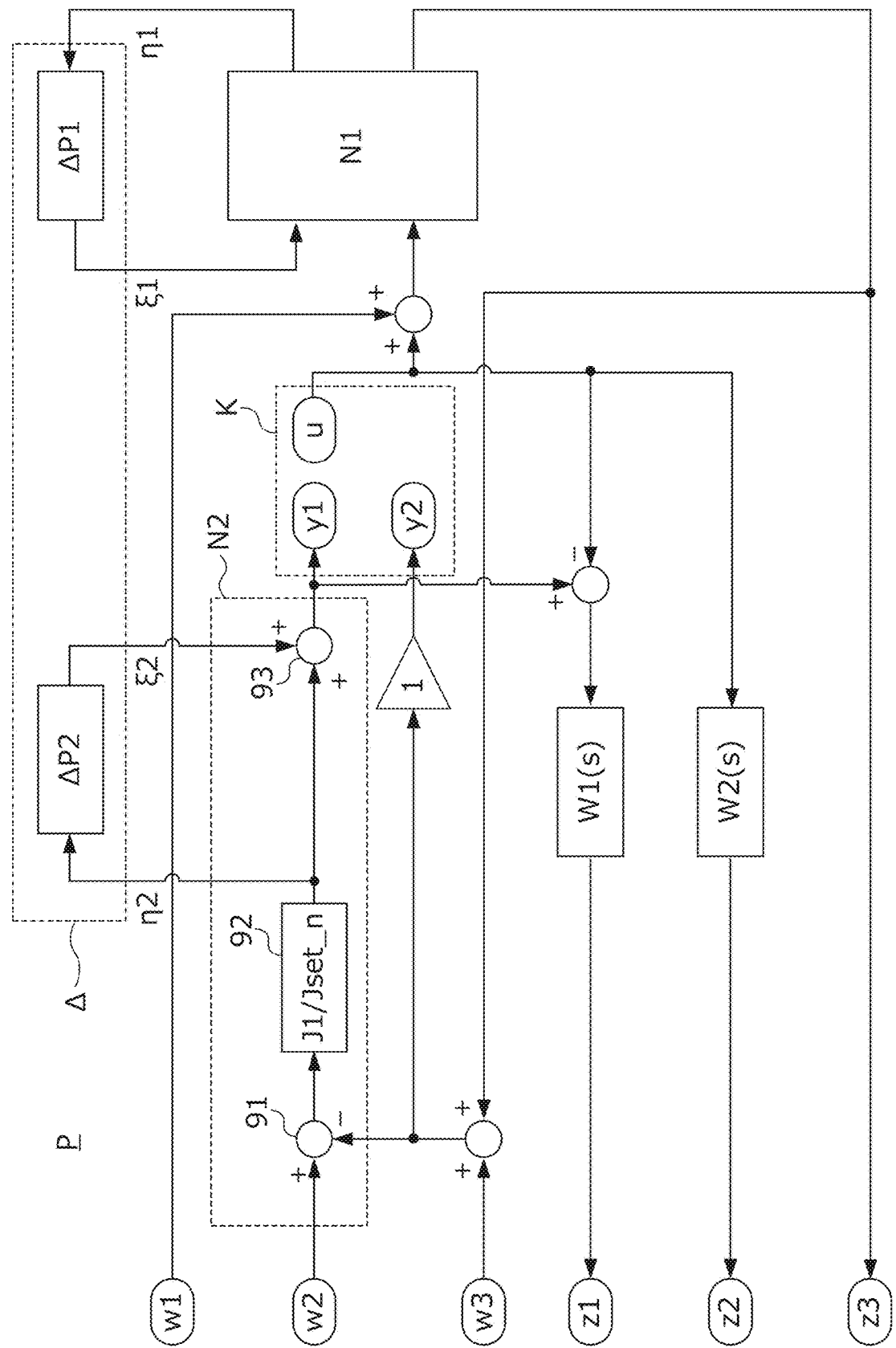
FIG. 6 is a diagram showing the configuration of a generalized plant and a perturbation unit in the feedback control system described above.

FIG. 6 is a diagram showing the configuration of the generalized plant P and the perturbation unit Δ. The generalized plant P is constructed by combining the nominal plant N1, the inertia compensation unit N2, and a plurality of weighting functions W1(s) and W2(s). The perturbation unit Δ includes the first perturbation unit ΔP1 that imparts a variation to the model parameters included in the nominal plant N1, and the second perturbation unit ΔP2 that imparts a variation to the model parameters included in the inertia compensation unit N2.

In the generalized plant P of FIG. 6, a plurality of input and output signals are defined which include the first disturbance input w1, the second disturbance input w2, the third disturbance input w3, the first evaluation output z1, the second evaluation output z2, the third evaluation output z3, the control input u, the first observation output y1, the second observation output y2, the first variation input η1, the second variation output η2, the first variation output ξ1, and the second variation output ξ2. The corresponding relationship between these input and output signals and the dynamometer system S of FIGS. 1 and 2 is as follows.

The first disturbance input w1 is an input signal to the generalized plant P, and corresponds to a disturbance relative to the control input u outputted from the controller K. The second disturbance input w2 is an input signal to the generalized plant P, and corresponds to the higher-level torque command signal to be inputted to the inertia compensation unit N2. The third disturbance input w3 is an input signal to the generalized plant P, and corresponds to the disturbance relative to the input-side shaft torque detection signal inputted to the controller K.

The control input u is an input signal from the controller K to the generalized plant P, and corresponds to the input-side torque current command signal. The sum of the control input u and the first disturbance input w1 is inputted to the nominal plant N1. The first observation output y1 is an input signal from the generalized plant P to the controller K, and corresponds to the inertia compensation torque signal outputted from the inertia compensation unit N2. The second observation output y2 is an input signal from the generalized plant P to the controller K, and corresponds to the input-side shaft torque detection signal. The second observation output y2 is obtained by multiplying the value "1" by the sum of the third evaluation output z3 corresponding to the input-side shaft torque detection signal outputted from the nominal plant N1 and the third disturbance input w3.

The first evaluation output z1 is an output signal of the generalized plant P, and corresponds to the input-output difference of the weighted controller K. The first evaluation output z1 is obtained by subtracting the control input u outputted from the controller K from the first observation output y1 inputted to the controller K, and weighting the resultant difference by a first weighting function W1 (s) set in advance. The second evaluation output z2 is an output signal of the generalized plant P, and corresponds to an output of the weighted controller K. The second evaluation output z2 is obtained by weighting the control input u outputted from the controller K by a second weighting function W2 (s) set in advance. The third evaluation output z3 is an output signal of the generalized plant P, and corresponds to a weighted input-side shaft torque detection signal. For the third evaluation output z3, an input-side shaft torque detection signal outputted from the nominal plant N1 is used.

Figure 7:
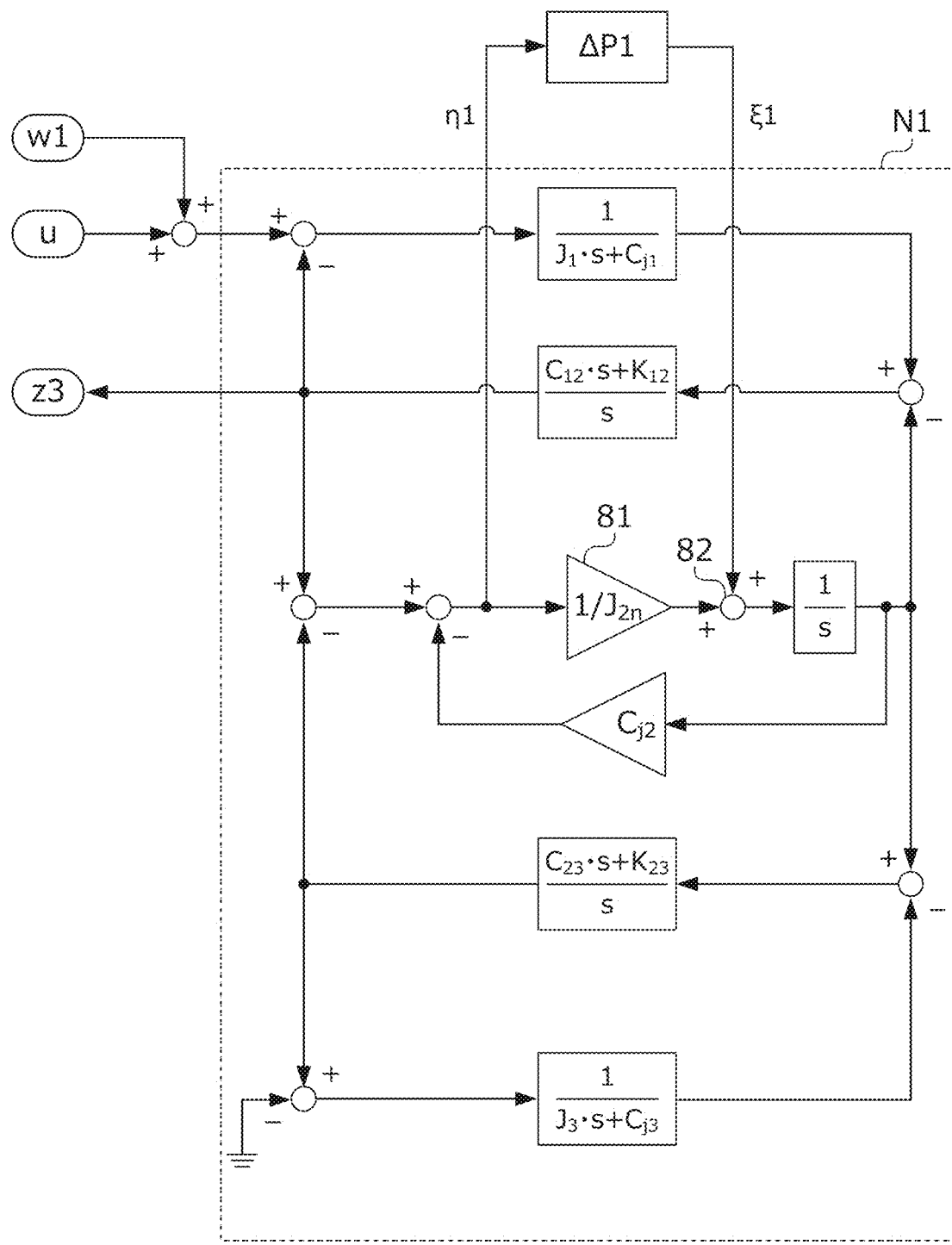
FIG. 7 is a diagram showing the configuration of a nominal plant in the generalized plant described above.

FIG. 7 is a diagram showing the configuration of the nominal plant N1. The nominal plant N1 includes, in the dynamometer system S of FIG. 1, an input-output characteristic simulating the input-output characteristics from the dynamo torque corresponding to the input-side torque current command signal $T_1$ until the shaft torque corresponding to the input-side shaft torque detection signal $T_{12}$.

As shown in FIG. 7, the nominal plant N1 is constructed by modeling the dynamometer system S by the equation of motion of the multi-inertia system. Such a dynamometer system S is constructed by connecting the input-side dynamometer, the test piece, and the absorption-side dynamometer in series. FIG. 7 shows a case in which the nominal plant N1 is constructed based on the equation of motion of a three-inertia system configured by coupling, for example, a first inertial body having a moment of inertia $J_1$ and a viscous friction coefficient $C_{j1}$, a second inertial body having a predetermined first nominal moment of inertia $J_{2n}$ and a viscous friction coefficient $C_{j2}$, and a third inertial body having a moment of inertia $J_3$ and a viscous friction coefficient $C_{j3}$ in series by a first shaft body having a spring coefficient $K_{12}$ and a torsional damping coefficient $C_{12}$ and a second shaft body having a torsional damping coefficient $K_{23}$ and a torsional damping coefficient $C_{23}$.

In the nominal plant N1, predetermined values are used for the specific values of the moments of inertia $J_1$ and $J_3$, the viscous friction coefficients $C_{j1}$, $C_{j2}$, and $C_{j3}$, the spring coefficients $K_{12}$ and $K_{23}$, and the torsional damping coefficients $C_{12}$ and $C_{23}$. Furthermore, the specific value of the first nominal moment of inertia $J_{2n}$ is determined for each of the resonance suppression control modules 541 to 546 to be designed, as will be described in detail later.

The first perturbation unit ΔP1 imparts a variation to the first nominal moment of inertia $J_{2n}$, which is one of a plurality of model parameters ($J_1$, $J_{2n}$, $J_3$, $C_{j1}$, $C_{j2}$, $C_{j3}$, $K_{12}$, $K_{23}$, $C_{12}$, and $C_{23}$) that define the input and output characteristics of the nominal plant N1. More specifically, the nominal plant N1 includes a nominal value multiplier unit 81 for multiplying the inverse of the first nominal moment of inertia $J_{2n}$ by the first variation input η1 corresponding to the torque inputted to the input-side coupling shaft, and a summing unit 82 for summing the first variation output ξ1 corresponding to the output signal of the first perturbation unit ΔP1 and the output signal of the nominal value multiplier unit 81.

The first perturbation unit ΔP1 generates a first variation output 1 when the first variation input η1 to the nominal value multiplier unit 81 is inputted, and inputs the output to the summing unit 82. Thus, the first perturbation unit ΔP1 imparts an additive variation to the inverse of the first nominal moment of inertia Jen. That is, if the bounded variation generated by a known algorithm in the first perturbation unit ΔP1 is d1, the moment of inertia $J_{2n}^\sim$ of the real object is expressed by the following expression (2).

$$1/J_{2n}^\sim = 1/J_{2n} + d1 \quad (2)$$

Referring back to FIG. 6, a description will be given of the configuration of the inertia compensation unit N2. The inertia compensation unit N2 includes an input-output characteristic simulating the input-output characteristic from the higher-level torque command signal T* and the input-side shaft torque detection signal $T_{12}$ until the inertial compensation torque signal $T_{ref}$ in the inertia compensator 52 of the input-side dynamometer control device 5 of FIG. 2.

As shown in FIG. 6, the inertia compensation unit N2 includes a subtraction unit 91, an inertia ratio multiplication unit 92, and a summation unit 93. The subtraction unit 91 generates a torque deviation signal by subtracting the second observation output y2 from the second disturbance input w2. The inertia ratio multiplication unit 92 generates a second variation input η2 by multiplying the inertia ratio ($J_1/J_{set}$ n) between the moment of inertia $J_1$ and the predetermined second nominal moment of inertia $J_{set\_n}$ of the input-side dynamometer with the torque deviation signal generated by the subtraction unit 91. The summation unit 93 sums the second variation output ξ2 corresponding to the output signal of the second perturbation unit ΔP2 and the second variation input η2.

Here, in the inertia compensation unit N2, a predetermined value is used for the specific value of the moment of inertia $J_1$ in the same manner as the nominal plant N1. Furthermore, for the specific value of the second nominal moment of inertia $J_{set\_n}$, a value is used which is determined for each of the resonance suppression control modules 541 to 546 to be designed, as will be described in detail later.

The second perturbation unit ΔP2 imparts a variation to the second nominal moment of inertia $J_{set\_n}$, which is one of a plurality of model parameters defining the input-output characteristics of the inertia compensation unit N2. More specifically, the second perturbation unit ΔP2 generates a second variation output 2 when the second variation input η2 outputted from the inertia ratio multiplication unit 92 is inputted, and inputs the output to the summation unit 93. Thus, the second perturbation unit ΔP2 imparts a multiplicative variation to the inverse of the second nominal moment of inertia $J_{set\_n}$. That is, assuming that the bounded variation generated by a known algorithm in the second perturbation unit ΔP2 is d2, the moment of inertia $J_{set\_n}^\sim$ of the actual object is expressed by the following expression (3).

$$J_1/J_{set\_n}^\sim = (1+d2) \times J_1/J_{set\_n} \quad (3)$$

Figure 8:
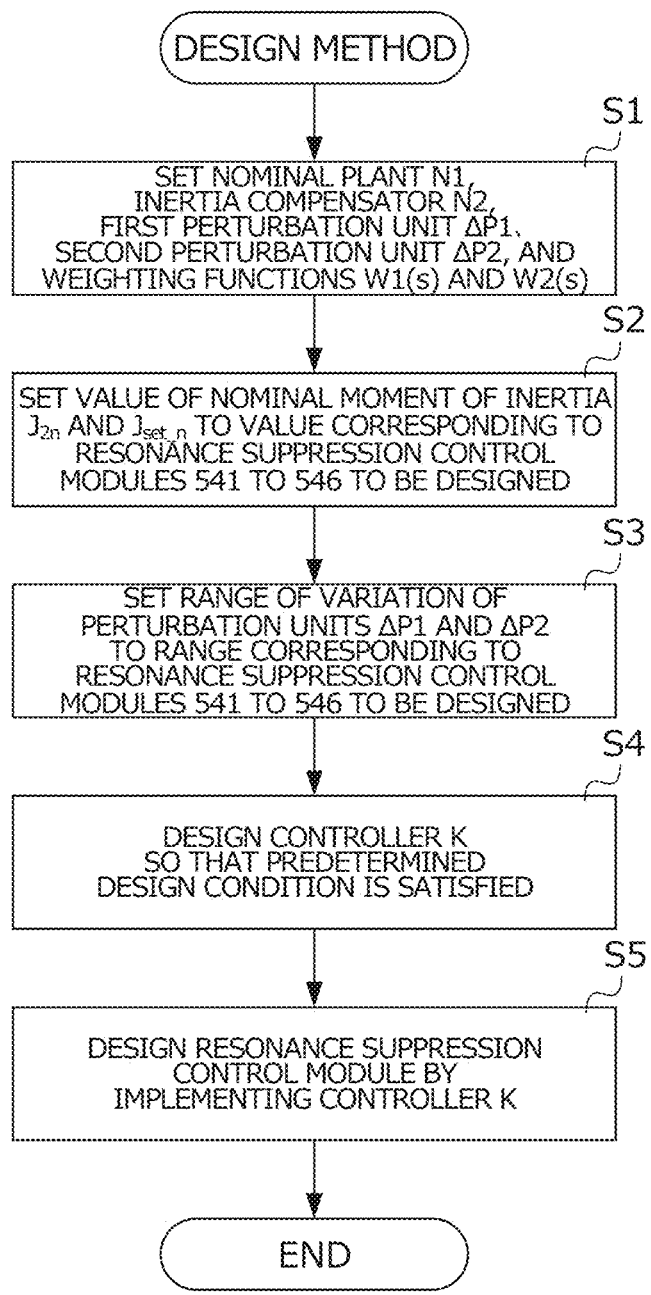
FIG. 8 is a flowchart showing a specific procedure of a method of designing each resonance suppression control module using the feedback control system described above.

FIG. 8 is a flowchart showing a specific procedure of a method of designing each of the resonance suppression control module 541 to 546 using the feedback control system 8 as described above.

First, in S1, the operator sets the nominal plant N1, the inertia compensation unit N2, the first perturbation unit ΔP1, the second perturbation unit ΔP2, and the weighting functions W1(s) and W2(s), as shown in FIGS. 5 to 7, using a computer.

Next, in S2, the operator sets the values of the first nominal moment of inertia $J_{2n}$ and the second nominal moment of inertia $J_{set\_n}$ to values corresponding to the resonance suppression control modules 541 to 546 to be designed.

More specifically, when designing the first resonance suppression control module 541 associated with the first region (refer to FIG. 4) among the setting ranges of the set values $J_{tgt}$ and $J_{set}$, the value of the first nominal moment of inertia $J_{2n}$ is set to, for example, a low inertia set value $J_{tgt\_n1}$ determined between the lower limit value $J_{tgtL}$ and the intermediate value $J_{tgt1}$ of the test piece inertia set value $J_{tgt}$, and the value of the second nominal moment of inertia $J_{set\_n}$ is set to, for example, a high inertia set value $J_{set\_n1}$ determined between the upper limit value $J_{setU}$ and the first intermediate value $J_{set1}$ of the electric inertia control set value $J_{set}$ (refer to FIG. 4).

Furthermore, when designing the second resonance suppression control module 542 associated with the second region among the setting ranges of the set values $J_{tgt}$ and $J_{set}$ (refer to FIG. 4), the value of the first nominal moment of inertia $J_{2n}$ is set to, for example, a low inertia set value $J_{tgt\_n1}$ determined between the lower limit value $J_{tgtL}$ and the intermediate value $J_{tgt1}$ of the test piece inertia set value $J_{tgt}$, and the value of the second nominal moment of inertia $J_{set\_n}$ is set to, for example, the intermediate inertia set value $J_{set\_n2}$ determined between the first intermediate value $J_{set1}$ and the second intermediate value $J_{set2}$ of the electric inertia control set value $J_{set}$ (refer to FIG. 4).

When designing the third resonance suppression control module 543 associated with the third region among the setting ranges of the set values $J_{tgt}$ and $J_{set}$ (refer to FIG. 4), the value of the first nominal moment of inertia $J_{2n}$ is set to, for example, a low inertia set value $J_{tgt\_n1}$ determined between the lower limit value $J_{tgtL}$ and the intermediate value $J_{tgt1}$ of the test piece inertia set value $J_{tgt}$, and the value of the second nominal moment of inertia $J_{set\_n}$ is set to, for example, a low inertia set value $J_{set\_n3}$ determined between the second intermediate value $J_{set2}$ and the lower limit value $J_{setL}$ of the electric inertia control set value $J_{set}$ (refer to FIG. 4).

When designing the fourth resonance suppression control module 544 associated with the fourth region among the setting ranges of the set values $J_{tgt}$ and $J_{set}$ (refer to FIG. 4), the value of the first nominal moment of inertia $J_{2n}$ is set to, for example, a high inertia set value $J_{tgt\_n2}$ determined between the intermediate value $J_{tgt1}$ and the upper limit value $J_{tgtU}$ of the test piece inertia set value $J_{tgt}$, and the value of the second nominal moment of inertia $J_{set\_n}$ is set to, for example, a high inertia set value $J_{set\_n1}$ determined between the upper limit value $J_{setU}$ and the first intermediate value $J_{set1}$ of the electric inertia control set value $J_{set}$ (refer to FIG. 4).

When designing the fifth resonance suppression control module 545 associated with the fifth region among the setting ranges of the set values $J_{tgt}$ and $J_{set}$ (refer to FIG. 4), the value of the first nominal moment of inertia $J_{2n}$ is set to, for example, a high inertia set value $J_{tgt\_n2}$ determined between the intermediate value $J_{tgt1}$ and the upper limit value $J_{tgtU}$ of the test piece inertia set value $J_{tgt}$, and the value of the second nominal moment of inertia $J_{set\_n}$ is set to, for example, an intermediate inertia set value $J_{set\_n2}$ determined between the first intermediate value $J_{set1}$ and the second intermediate value $J_{set2}$ of the electric inertia control set value $J_{set}$ (refer to FIG. 4).

When designing the sixth resonance suppression control module 546 associated with the sixth region among the setting ranges of the set values $J_{tgt}$ and $J_{set}$ (refer to FIG. 4), the value of the first nominal moment of inertia $J_{2n}$ is set to, for example, a high inertia set value $J_{tgt\_n2}$ determined between the intermediate value $J_{tgt1}$ and the upper limit value $J_{tgtU}$ of the test piece inertia set value $J_{tgt}$, and the value of the second nominal moment of inertia $J_{set\_n}$ is set to, for example, a low inertia set value $J_{set\_n3}$ determined between the second intermediate value $J_{set2}$ and the lower limit value $J_{setL}$ of the electric inertia control set value $J_{set}$ (refer to FIG. 4).

Next, in S3, the operator sets the range of variation imparted to the first nominal moment of inertia $J_{2n}$ and the second nominal moment of inertia $J_{set\_n}$ by the first perturbation unit $\Delta P1$ and the second perturbation unit $\Delta P2$ in a range corresponding to the resonance suppression control modules 541 to 546 to be designed.

More specifically, when designing the first resonance suppression control module 541 associated with the first region, the bounded variation d1 generated by the first perturbation unit $\Delta P1$ is set such that the moment of inertia $\tilde{J_{2n}}$ of the actual object given by the above expression (2) varies over a range that encompasses a low inertia range equal to or more than the lower limit $J_{tgtL}$ and less than the intermediate value $J_{tgt1}$. Furthermore, in this case, the bounded variation d2 generated by the second perturbation unit $\Delta P2$ is set such that the moment of inertia $\tilde{J_{set\_n}}$ of the actual object given by the above expression (3) varies over a range that encompasses a high inertia range equal to or less than the upper limit $J_{setU}$ and equal to or more than the first intermediate value $J_{set1}$.

Furthermore, when designing the second resonance suppression control module 542 associated with the second region, the bounded variation d1 generated by the first perturbation unit $\Delta P1$ is set such that the moment of inertia $\tilde{J_{2n}}$ of the actual object given by the above expression (2) varies over a range that encompasses a low inertia range equal to or more than the lower limit $J_{tgtL}$ and less than the intermediate value $J_{tgt1}$. Furthermore, in this case, the bounded variation d2 generated by the second perturbation unit $\Delta P2$ is set such that the moment of inertia $\tilde{J_{set\_n}}$ of the actual object given by the above expression (3) varies over a range that encompasses an intermediate inertia range less than the first intermediate value $J_{set1}$ and equal to or more than the second intermediate value $J_{set2}$.

Furthermore, when designing the third resonance suppression control module 543 associated with the third region, the bounded variation d1 generated by the first perturbation unit $\Delta P1$ is set such that the moment of inertia $\tilde{J_{2n}}$ of the actual object given by the above expression (2) varies over a range that encompasses a low inertia range equal to or more than the lower limit $J_{tgtL}$ and less than the intermediate value $J_{tgt1}$. In this case, the bounded variation d2 generated by the second perturbation unit $\Delta P2$ is set such that the moment of inertia $\tilde{J_{set\_n}}$ of the actual object given by the above expression (3) varies over a range that encompasses a low inertia range less than the second intermediate value $J_{set2}$ and equal to or more than the lower limit $J_{setL}$.

Furthermore, when designing the fourth resonance suppression control module 544 associated with the fourth region, the bounded variation d1 generated by the first perturbation unit $\Delta P1$ is set such that the moment of inertia $\tilde{J_{2n}}$ of the actual object given by the above expression (2) varies over a range that encompasses a high inertia range equal to or more than the intermediate value $J_{tgt1}$ and equal to or less than the upper limit value $J_{tgtU}$. Furthermore, in this case, the bounded variation d2 generated by the second perturbation unit $\Delta P2$ is set such that the moment of inertia $\tilde{J_{set\_n}}$ of the actual object given by the above expression (3) varies over a range that encompasses a high inertia range equal to or less than the upper limit $J_{setU}$ and equal to or more than the first intermediate value $J_{set1}$.

When designing the fifth resonance suppression control module 545 associated with the fifth region, the bounded variation d1 generated by the first perturbation unit $\Delta P1$ is set such that the moment of inertia $\tilde{J_{2n}}$ of the actual object given by the above expression (2) varies over a range that encompasses a high inertia range equal to or more than the intermediate value $J_{tgt1}$ and equal to or less than the upper limit value $J_{tgtU}$. In this case, the bounded variation d2 generated by the second perturbation unit $\Delta P2$ is set such that the moment of inertia $\tilde{J_{set\_n}}$ of the actual object given by the above expression (3) varies over a range that encompasses an intermediate inertia range less than the first intermediate value $J_{set1}$ and equal to or more than the second intermediate value $J_{set2}$.

Furthermore, when designing the sixth resonance suppression control module 546 associated with the sixth region, the bounded variation d1 generated by the first perturbation unit $\Delta P1$ is set such that the moment of inertia $\tilde{J_{2n}}$ of the actual object given by the above expression (2) varies over a range that encompasses a high inertia range equal to or more than the intermediate value $J_{tgt1}$ and equal to or less than the upper limit value $J_{tgtU}$. Furthermore, in this case, the bounded variation d2 generated by the second perturbation unit $\Delta P2$ is set such that the moment of inertia $\tilde{J_{set\_n}}$ of the actual object given by the above expression (3) varies over a range that encompasses a low inertia range less than the second intermediate value $J_{set2}$ and equal to or more than the lower limit $J_{setL}$.

In S4, the operator designs the controller K by a computer so that a predetermined design condition determined to realize robust stability is satisfied in the feedback control system 8 configured by combining the nominal plant N1, the inertia compensation unit N2, the first perturbation unit $\Delta P1$, the second perturbation unit $\Delta P2$, and the controller K constructed as described above. More specifically, such a controller K is derived by performing iterative operation based on the D-K iteration method on the computer, for example.

In S5, the resonance suppression control modules 541 to 546 are designed by implementing the controller K designed in S4 in the digital signal processor.

Next, the results of the simulation performed to verify the resonance suppression effect of the input-side dynamometer control device 5 according to the present embodiment in which the plurality of resonance suppression control modules 541 to 546 as described above are equipped will be described with reference to FIGS. 9 and 10.

In this simulation, excitation control was performed using the input-side dynamometer control device 5. More specifically, in this excitation control, while exciting the higher-level torque command signal to be inputted to the input-side dynamometer control device 5, the excitation frequency of the higher-level torque command signal was changed within a predetermined range including a resonance frequency over a predetermined time. In addition, in this simulation, the test piece inertia set value $J_{tgt}$ was changed at five points (a1<a2<a3<a4<a5) in which a1, a2, and a3 were determined within the low inertia range ($J_{tgtL}$ to $J_{tgt1}$), and a4 and a5 were determined within the high inertia range ($J_{tgt1}$ to $J_{tgtU}$), and the electric inertia control set value $J_{set}$ was changed at five points (b1<b2<b3<b4<b5) at which b1 and b2 were determined within the low inertia range ($J_{set2}$ to $J_{setL}$), b3 was determined within the intermediate inertia range ($J_{set1}$ to $J_{set2}$), and b4 and b5 were determined within the high inertia range ($J_{setU}$ to $J_{set1}$), and the excitation control was performed for each combination.

Figure 9:
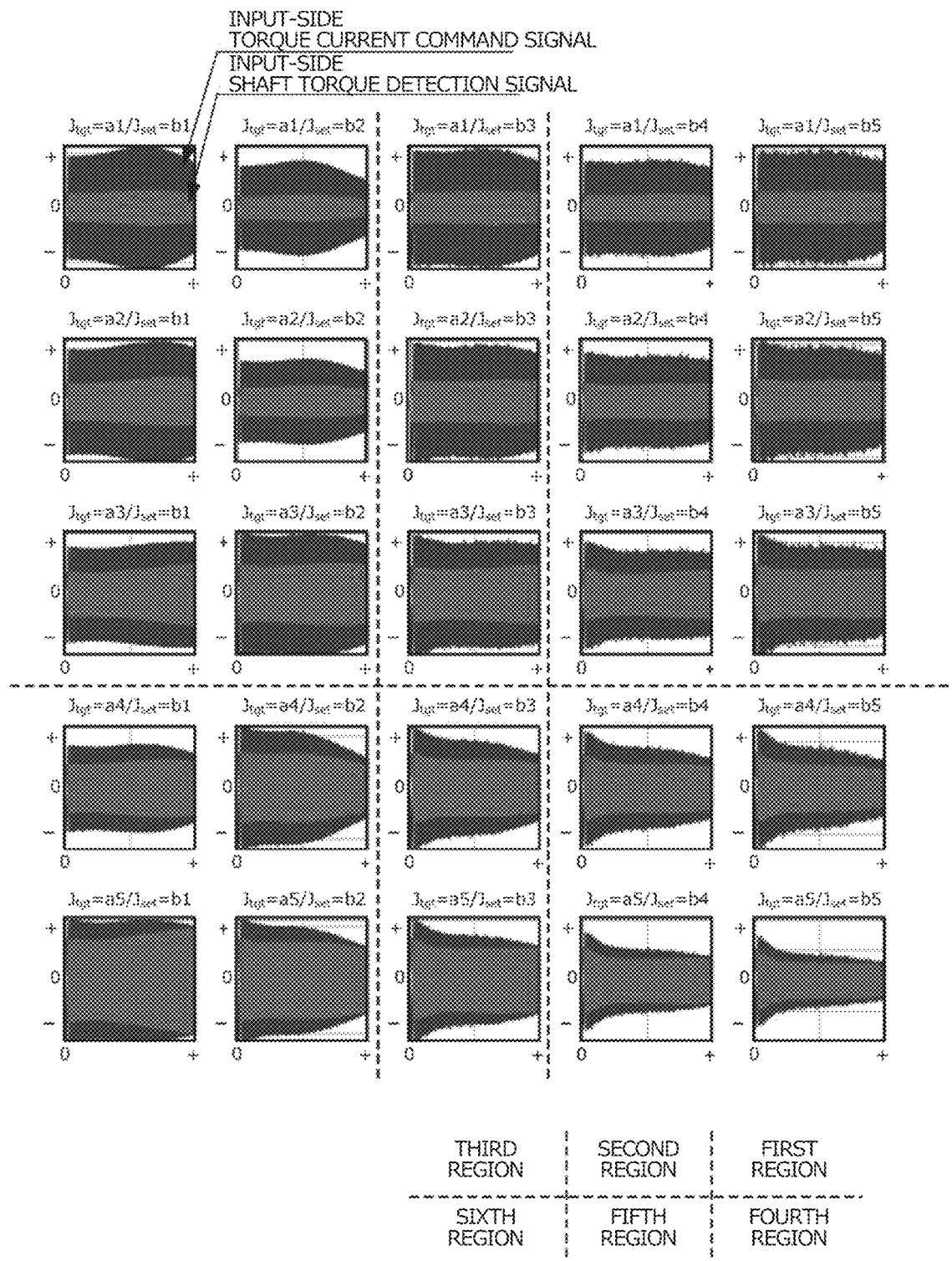
FIG. 9 is a diagram showing the time change of the input-side torque current command signal and the input-side shaft torque detection signal at the time of the execution of excitation control.

FIG. 9 is a diagram showing the time change of the input-side torque current command signal and the input-side shaft torque detection signal at the time of the execution of the excitation control. The horizontal axis in FIG. 9 indicates time, and the vertical axis indicates torque. FIG. 10 is a diagram showing the response of the shaft speed when the shaft speed and electric inertia control at the time of the execution of the excitation control is ideally functioning. The horizontal axis in FIG. 10 indicates time, and the vertical axis indicates speed. It should be noted that FIG. 10 shows the response of the ideal shaft speed by a broken line.

In a case in which the test piece inertia set value $J_{tgt}$ is a1, a2, and a3 and the electric inertia control set value $J_{set}$ is b1 and b2, the third resonance suppression control module 543 associated with the third region is incorporated in the control circuit. In a case in which the test piece inertia set value $J_{tgt}$ is a1, a2, and a3, and the electric inertia control set value $J_{set}$ is b3, the second resonance suppression control module 542 associated with the second region is incorporated in the control circuit. In a case in which the test piece inertia set value $J_{tgt}$ is a1, a2, and a3, and the electric inertia control set value $J_{set}$ is b4 and b5, the first resonance suppression control module 541 associated with the first region is incorporated in the control circuit.

In a case in which the test piece inertia set value $J_{tgt}$ is a4 and a5, and the electric inertia control set value $J_{set}$ is b1 and b2, the sixth resonance suppression control module 546 associated with the sixth region is incorporated in the control circuit. In a case in which the test piece inertia set value $J_{tgt}$ is a4 and a5, and the electric inertia control set value $J_{set}$ is b3, the fifth resonance suppression control module 545 associated with the fifth region is incorporated in the control circuit. In a case in which the test piece inertia set value $J_{tgt}$ is a4 and a5, and the electric inertia control set value $J_{set}$ is b4 and b5, the fourth resonance suppression control module 544 associated with the fourth region is incorporated in the control circuit.

In a case of not performing resonance suppression control, if the excitation frequency in the excitation control is changed within the range including the resonance frequency, there is a possibility that the amplitude of the input-side torque current command signal and the input-side shaft torque detection signal will greatly increase. In contrast, according to the input-side dynamometer control device 5 according to the present embodiment, as shown in FIG. 9, the change of the set values $J_{tgt}$ and $J_{set}$ within the set range no longer allow the amplitude of the input-side torque current command signal and the input-side shaft torque detection signal to increase greatly. That is, according to the input-side dynamometer control device 5, by selecting a suitable module from among the plurality of resonance suppression control modules 541 to 546 in accordance with the combinations of the set values $J_{tgt}$ and $J_{set}$, it is possible to constantly exhibit an appropriate resonance suppression control function regardless of how the set values $J_{tgt}$ and $J_{set}$ are set.

Figure 10:
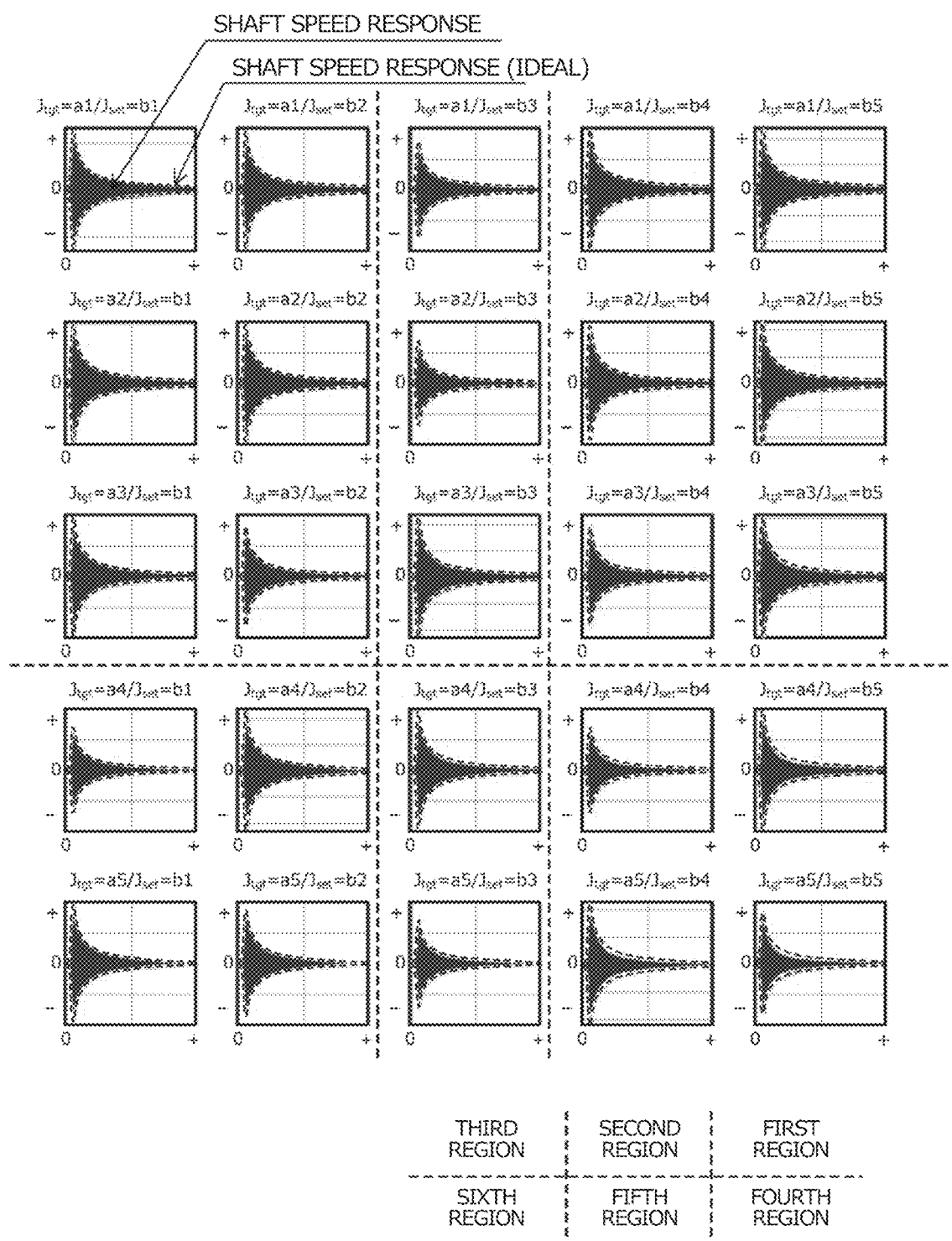
FIG. 10 is a diagram showing the response of the shaft speed when the shaft speed and the electric inertia control at the time of the execution of the excitation control is ideally functioning.
Figure 11:
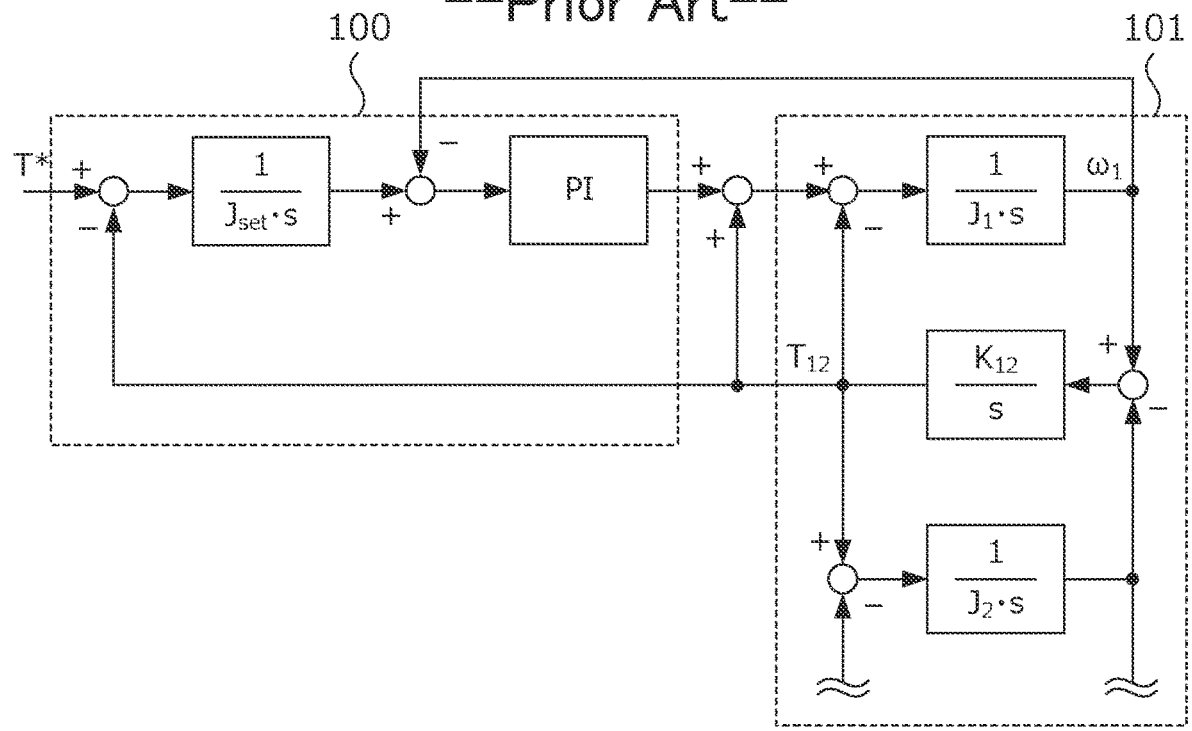
FIG. 11 is a diagram showing an example of a conventional electric inertia control device.
Figure 12:
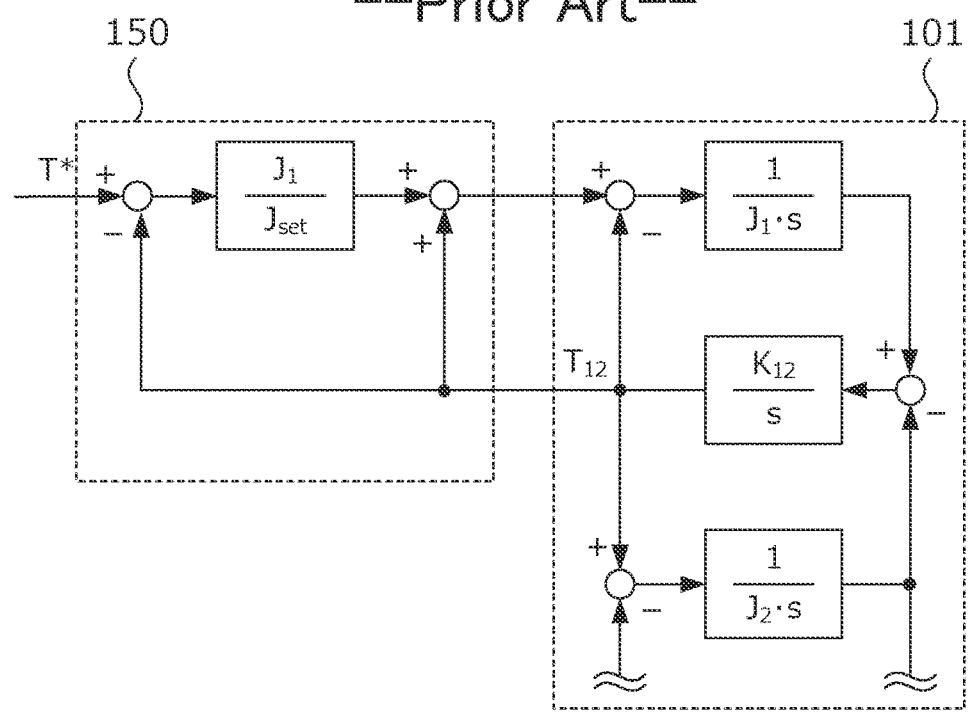
FIG. 12 is a diagram showing the configuration of an electric inertia control device based on the disclosure of Japanese Unexamined Patent Application, Publication No. 2004-361255.

According to the input-side dynamometer control device 5 according to the present embodiment, as shown in FIG. 10, it is possible to bring the shaft speed towards the ideal shaft speed no matter how the set values $J_{tgt}$ and $J_{set}$ are changed within the set range. That is, according to the input-side dynamometer control device 5, by selecting a suitable module among the plurality of resonance suppression control modules 541 to 546 in accordance with the combinations of the set values $J_{tgt}$ and $J_{set}$, it is possible to achieve the electric inertia control with high accuracy while constantly exhibiting an appropriate resonance suppression control function regardless of how the set values $J_{tgt}$ and $J_{set}$ are set.

The input-side dynamometer control device 5 according to the present embodiment has the following effects.

(1) In the input-side dynamometer control device 5, the inertia compensator 52 generates an inertial compensation torque signal $T_{ref}$ simulating the behavior of the inertial body having a set inertia based on the higher-level torque command signal T* and the input-side shaft torque detection signal $T_{12}$. In the inertia compensator 52, by generating the inertia compensation torque signal $T_{ref}$ by directly feeding back the input-side shaft torque detection signal $T_{12}$ as above, it is possible to accurately simulate the behavior of the inertia body having a set inertia in the input-side dynamometer 11. Furthermore, the resonance suppression control device 53 of the input-side dynamometer control device 5 generates the input-side torque current command signal $T_1$ so as to suppress the resonance of the mechanical system including the test piece W and the input-side dynamometer 11, by using the inertia compensation torque signal $T_{ref}$ and the input-side shaft torque detection signal $T_{12}$ obtained by the inertia compensator 52. Thus, according to the input-side dynamometer control device 5, it is possible to extend the control response to a high bandwidth while preventing destabilization due to resonance phenomenon in the mechanical system.

Furthermore, the resonance suppression control device 53 includes a plurality of resonance suppression control modules 541 to 546 having a resonance suppression control function and each having different input-output characteristics, and a selector 55 for selecting one of the plurality of resonance suppression control modules 541 to 546 based on the set values $J_{tgt}$ and $J_{set}$ acquired by the set value acquiring unit 58, and the resonance suppression control device 53 inputs the inertia compensation torque signal $T_{ref}$ and the input-side shaft torque detection signal $T_{12}$ to the resonance suppression control module selected by the selector 55, and inputs the input-side torque current command signal $T_1$ generated by the selected resonance suppression control module to the input-side inverter 21. In other words, in the resonance suppression control device 53, the plurality of resonance suppression control modules 541 to 546 having a resonance suppression control function are prepared in advance, and a control module selected according to the set values $J_{tgt}$ and $J_{set}$ among the plurality of resonance suppression control modules 541 to 546 is incorporated in the control circuit. Therefore, in the input-side dynamometer control device 5, the plurality of resonance suppression control modules 541 to 546, each having low versatility but high control response, are designed beforehand, and one corresponding to the set values $J_{tgt}$ and $J_{set}$ among the plurality of resonance suppression control modules 541 to 546 can be incorporated, a result of which it is possible to perform electric inertia control with a high control response even when the test piece W or the set inertia is changed.

(2) In the input-side dynamometer control device 5, the set value acquiring unit 58 acquires both of the set values $J_{tgt}$ and $J_{set}$, and the selector 55 selects the resonance-suppression control module with which the combination of the set values $J_{tgt}$ and $J_{set}$ is associated by the control module selecting unit 551. Therefore, according to the input-side dynamometer control device 5, it is possible to incorporate an appropriate resonance suppression control module according to the set values $J_{tgt}$ and $J_{set}$, and perform electric inertia control with a control response.

(3) In the input-side dynamometer control device 5, when the set values $J_{tgt}$ and $J_{set}$ belong to a range associated by the control module selection unit 551, each of the resonance suppression control modules 541 to 546 is designed to stably exhibit a control performance equal to or higher than a predetermined required control performance. Therefore, according to the input-side dynamometer control device 5, it is possible to perform electric inertia control with a control response even when the test piece W or the set inertia is changed.

(4) In the input-side dynamometer control device 5, for the resonance suppression control module, a controller K is used which is designed by a computer so as to satisfy a predetermined design condition in a feedback control system 8 including a nominal plant N1 and a generalized plant P including an inertia compensation unit N2, a first perturbation unit ΔP1, a second perturbation unit ΔP2, and the controller K for the generalized plant P. According to the input-side dynamometer control device 5, it is possible to perform electric inertia control with a high control response by using the controller K designed by a design method based on the generalized plant P as described above, as a resonance suppression control module for realizing resonance suppression control.

(5) In the input-side dynamometer control device 5, for each of the resonance suppression control modules 541 to 546, the controller K is used which is designed in the feedback control system 8 by changing a range for imparting a variation to the first nominal moment of inertia $J_{2n}$ by the first perturbation unit ΔP1 and a range for imparting a variation to the second nominal moment of inertia $J_{set\_n}$ by the second perturbation unit ΔP2. Therefore, according to the input-side dynamometer control device 5, it is possible to incorporate an appropriate resonance suppression control module according to the set values $J_{tgt}$ and $J_{set}$ and perform electric inertia control with a high control response.

Although an embodiment of the present invention has been explained above, the present invention is not to be limited thereto. The configuration of detailed parts may be modified where appropriate within a scope of the gist of the present invention.

For example, in the above-described embodiment, a case in which both the test piece inertia set value $J_{tgt}$ and the electric inertia control set value $J_{set}$ are acquired by the set value acquiring unit 58, and a single resonance suppression control module is selected based on the combination of the set values $J_{tgt}$ and $J_{set}$ has been described. However, the present invention is not limited thereto. The set value acquiring unit may acquire only one of the test piece inertia set value $J_{tgt}$ and the electric inertia control set value $J_{set}$, and select one resonance suppression control module based on the acquired set values.

Furthermore, in the above embodiment, the combination of the set values $J_{tgt}$ and $J_{set}$ and one of the resonant suppression control modules 541 to 546 are associated with each other by the setting map shown in FIG. 4. However, the form of the association unit is not limited to this. The format of the associating unit is not limited to the map shown in FIG. 4, and a table, an arithmetic expression, a neural network, and the like may be used.

In the above-described embodiment, a case in which the electric inertia control device of the present invention is applied to the input-side dynamometer control device 5 for controlling the input-side dynamometer 11 connected to the input shaft Wi of the test piece W, which is a drive train, has been described. However, the present invention is not limited thereto. The electric inertia control device of the present invention can also be applied to the absorption-side dynamometer control device 6 for controlling the absorption-side dynamometer 12 connected to the output shaft Wo of the test piece W. In a case in which the electric inertia control device is applied to the input-side dynamometer 11 as described above, the set inertia corresponds to the moment of inertia of the power generating source such as an engine or a drive motor connected to the input shaft Wi in the completed vehicle equipped with the test piece W. On the contrary, in a case in which the electric inertia control device is applied to the absorption-side dynamometer control device 6, the set inertia corresponds to the vehicle weight acting on the output shaft Wo in the completed vehicle equipped with the test piece W. Furthermore, the electric inertia control device according to the present invention may be applied to both the input-side dynamometer control device 5 and the absorption-side dynamometer control device 6.

In the above-described embodiment, a case in which the electric inertia control device according to the present invention is applied to the drive train bench system has been described. However, the present invention is not limited to this. The electric inertia control device according to the present invention is not limited to drive train bench systems, and can be applied to other dynamometer systems such as an engine bench system.

EXPLANATION OF REFERENCE NUMERALS

S . . . dynamometer system
W . . . test piece
Wi . . . input shaft (shaft)
Wo . . . output shaft (shaft)
S1 . . . input-side coupling shaft (coupling shaft)
11 . . . input-side dynamometer (dynamometer)
21 . . . input-side inverter (inverter)
41 . . . input-side shaft torque sensor (shaft torque sensor)
5 . . . input-side dynamometer control device (electric inertia control device)
52 . . . inertia compensator
53 . . . resonance suppression control device
541, 542, 543, 544, 545, 546 . . . resonance suppression control module (control module)
55 . . . selector
551 . . . control module selection unit (association unit)
58 . . . set value acquiring unit

The invention claimed is:
1. A dynamometer system comprising:
a test piece including a shaft;
a dynamometer connected to the shaft via a coupling shaft;

an electric inertia control device simulating behavior of an inertial body having predetermined set inertia by the dynamometer;
an inverter supplying electric power to the dynamometer according to a torque current command signal; and
a shaft torque sensor generating a shaft torque detection signal corresponding to a shaft torque occurring in the coupling shaft, the electric inertia control device comprising:
an inertia compensator that generates an inertia compensation torque signal simulating behavior of the inertial body based on a higher-level torque command signal and the shaft torque detection signal;
a resonance suppression control device that generates the torque current command signal so as to suppress a resonance of a mechanical system including the test piece and the dynamometer, based on the inertia compensation torque signal and the shaft torque detection signal; and
a set value acquiring unit that acquires both a set value of the set inertia and a set value of test piece inertia,
wherein the resonance suppression control device includes a plurality of control modules generating the torque current command signal so as to suppress the resonance based on the inertia compensation torque signal and the shaft torque detection signal, and each having different input-output characteristics, and a selector that selects one of the plurality of control modules based on a set value of the set inertia and a set value of the test piece inertia acquired by the set value acquiring unit, and the resonance suppression control device is configured to input the inertia compensation torque signal and the shaft torque detection signal to a control module selected by the selector, and input a torque current command signal generated in the control module selected to the inverter.

2. The dynamometer system according to claim 1, wherein the selector includes an association unit that associates a range to which a combination of a value of the set inertia and a value of the test piece inertia belongs with one among the plurality of control modules, and is configured to select a control module with which the combination of the set values acquired by the set value acquiring unit is associated by the association unit.

3. The dynamometer system according to claim 2, wherein, in a case in which a value of the set inertia and a value of the test piece inertia belong to a range associated by the association unit, each of the control modules is designed to stably exhibit a control performance equal to or more than a predetermined required control performance.

4. The dynamometer system according to claim 2, wherein the control module is a controller designed by a computer so as to satisfy a predetermined design condition in a feedback control system including: a generalized plant including a nominal plant simulating input-output characteristics of a control object and an inertia compensation unit simulating input-output characteristics of the inertia compensator; a test piece inertia perturbation unit that imparts a variation to a test piece inertia parameter included in the nominal plant; a set inertia perturbation unit that imparts a variation to a set inertia parameter included in the inertia compensation unit; and the controller that gives an input to the generalized plant based on an output from the generalized plant.

5. The dynamometer system according to claim 4, wherein the each of the control modules is the controller designed by changing a range for imparting a variation to the test piece inertia parameter by the test piece inertia perturbation unit and a range for imparting a variation to the set inertia parameter by the set inertia perturbation unit in the feedback control system.

6. The dynamometer system according to claim 1, wherein the test piece is a vehicle drive train that changes speed of dynamic force inputted to an input shaft and transmits the dynamic force to an output shaft, and the dynamometer is connected to the input shaft via the coupling shaft.

7. The dynamometer system according to claim 1, wherein the test piece is a vehicle drive train that changes speed of dynamic force inputted to an input shaft and transmits the dynamic force to an output shaft, and the dynamometer is connected to the output shaft via the coupling shaft.

8. A dynamometer system comprising:
a test piece including a shaft;
a dynamometer connected to the shaft via a coupling shaft;
an electric inertia control device simulating behavior of an inertial body having predetermined set inertia by the dynamometer;
an inverter supplying electric power to the dynamometer according to a torque current command signal; and
a shaft torque sensor generating a shaft torque detection signal corresponding to a shaft torque occurring in the coupling shaft, the electric inertia control device comprising:
an inertia compensator that generates an inertia compensation torque signal simulating behavior of the inertial body based on a higher-level torque command signal and the shaft torque detection signal;
a resonance suppression control device that generates the torque current command signal so as to suppress a resonance of a mechanical system including the test piece and the dynamometer, based on the inertia compensation torque signal and the shaft torque detection signal; and
a set value acquiring unit that acquires a set value of the set inertia,
wherein the resonance suppression control device includes a plurality of control modules generating the torque current command signal so as to suppress the resonance based on the inertia compensation torque signal and the shaft torque detection signal, and each having different input-output characteristics, and a selector that selects one of the plurality of control modules based on a set value of the set inertia acquired by the set value acquiring unit, and the resonance suppression control device is configured to input the inertia compensation torque signal and the shaft torque detection signal to a control module selected by the selector, and input a torque current command signal generated in the control module selected to the inverter,
wherein the control module is a controller designed by a computer so as to satisfy a predetermined design condition in a feedback control system including: a generalized plant including a nominal plant simulating input-output characteristics of a control object and an inertia compensation unit simulating input-output characteristics of the inertia compensator; a set inertia perturbation unit that imparts a variation to a set inertia parameter included in the inertia compensation unit; and the controller that gives an input to the generalized plant based on an output from the generalized plant, and wherein the each of the control modules is the controller designed by changing a range for imparting a variation to the set inertia parameter by the set inertia perturbation unit in the feedback control system.

9. The dynamometer system according to claim 8, wherein the test piece is a vehicle drive train that changes speed of dynamic force inputted to an input shaft and transmits the dynamic force to an output shaft, and the dynamometer is connected to the input shaft via the coupling shaft.

10. The dynamometer system according to claim 8, wherein the test piece is a vehicle drive train that changes speed of dynamic force inputted to an input shaft and transmits the dynamic force to an output shaft, and the dynamometer is connected to the output shaft via the coupling shaft.

11. A dynamometer system comprising:
a test piece including a shaft;
a dynamometer connected to the shaft via a coupling shaft;
an electric inertia control device simulating behavior of an inertial body having predetermined set inertia by the dynamometer;
an inverter supplying electric power to the dynamometer according to a torque current command signal; and
a shaft torque sensor generating a shaft torque detection signal corresponding to a shaft torque occurring in the coupling shaft, the electric inertia control device comprising:
an inertia compensator that generates an inertia compensation torque signal simulating behavior of the inertial body based on a higher-level torque command signal and the shaft torque detection signal;
a resonance suppression control device that generates the torque current command signal so as to suppress a resonance of a mechanical system including the test piece and the dynamometer, based on the inertia compensation torque signal and the shaft torque detection signal; and
a set value acquiring unit that acquires a set value of test piece inertia,
wherein the resonance suppression control device includes a plurality of control modules generating the torque current command signal so as to suppress the resonance based on the inertia compensation torque signal and the shaft torque detection signal, and each having different input-output characteristics, and a selector that selects one of the plurality of control modules based on a set value of the set inertia acquired by the set value acquiring unit, and the resonance suppression control device is configured to input the inertia compensation torque signal and the shaft torque detection signal to a control module selected by the selector, and input a torque current command signal generated in the control module selected to the inverter,
wherein the control module is a controller designed by a computer so as to satisfy a predetermined design condition in a feedback control system including: a generalized plant including a nominal plant simulating input-output characteristics of a control object; a test piece inertia perturbation unit that imparts a variation to a test piece inertia parameter included in the nominal plant; and the controller that gives an input to the generalized plant based on an output from the generalized plant, and
wherein the each of the control modules is the controller designed by changing a range for imparting a variation to the test piece inertia parameter by the test piece inertia perturbation unit in the feedback control system.

12. The dynamometer system according to claim 11, wherein the test piece is a vehicle drive train that changes speed of dynamic force inputted to an input shaft and transmits the dynamic force to an output shaft, and the dynamometer is connected to the input shaft via the coupling shaft.

13. The dynamometer system according to claim 11, wherein the test piece is a vehicle drive train that changes speed of dynamic force inputted to an input shaft and transmits the dynamic force to an output shaft, and the dynamometer is connected to the output shaft via the coupling shaft.

* * * * *